US 6,671,005 B1

(12) United States Patent
Pujol et al.

(10) Patent No.: US 6,671,005 B1
(45) Date of Patent: Dec. 30, 2003

(54) DIGITAL MICROMIRROR STAGE LIGHTING SYSTEM

(75) Inventors: Roger A. Pujol, Mohegan Lake, NY (US); Thomas P. Tyler, Wallkill, NY (US)

(73) Assignee: Altman Stage Lighting Company, Yonkers, NY (US)

( * ) Notice: Subject to any disclaimer, the term of this patent is extended or adjusted under 35 U.S.C. 154(b) by 0 days.

(21) Appl. No.: 09/337,725

(22) Filed: Jun. 21, 1999

(51) Int. Cl.[7] ............................. H04N 5/74; G02F 1/00
(52) U.S. Cl. ................... 348/771; 348/744; 348/770; 472/57; 362/368
(58) Field of Search ............................. 348/744, 750, 348/759, 770, 771, 789, 795, 836; 362/272, 368, 371, 384, 404, 373, 362, 367; 472/59, 57, 60, 61

(56) References Cited

U.S. PATENT DOCUMENTS

| | | |
|---|---|---|
| 3,936,871 A | 2/1976 | Mohon |
| 4,441,791 A | 4/1984 | Hornbeck |
| 4,566,935 A | 1/1986 | Hornbeck |
| 4,596,992 A | 6/1986 | Hornbeck |
| 4,615,555 A | 10/1986 | Bateham |

(List continued on next page.)

OTHER PUBLICATIONS

Analysis of Electronic Cinema Projection with the Texas Instruments Digital Micromirror Device Display System, Gregory Hewlett and William Werner, SMPTE, 1995, pp. 1–10.

Display System Architecture for Digital Micromirror Device Based Projectors, James M. Florence and Lars A. Yoder, SPIE 2650, pp. 193–208.

*Primary Examiner*—Victor R. Kostak
(74) *Attorney, Agent, or Firm*—Lackenbach Siegel LLP; Myron Greenspan

(57) ABSTRACT

A light display system for projecting digitally generated light beams onto a stage display, comprising a housing rotatable about at least one axis, a deformable mirror device (DMD) having a surface comprising an array of deformable mirror cells, the DMD being mounted in the housing, a light source mounted in the housing for directing a light beam in an optical path that impinges upon the surface of the DMD, and digital control signals to the DMD for digitally activating selected deformable mirror cells of the DMD to reflect digitally selected light beams onto the stage display having the optical effect of a continuous moving image or images. The housing is rotatable about a second axis transverse to the first axis. Coloring devices can be mounted in the housing.

27 Claims, 16 Drawing Sheets

U.S. PATENT DOCUMENTS

| | | |
|---|---|---|
| 4,662,746 A | 5/1987 | Hornbeck |
| 4,663,698 A | 5/1987 | Tomlinson |
| 4,701,833 A * | 10/1987 | Bornhorst .................. 362/294 |
| 4,710,732 A | 12/1987 | Hornbeck |
| 4,729,071 A | 3/1988 | Solomon |
| 4,769,743 A * | 9/1988 | Callahan ..................... 362/18 |
| 4,777,568 A | 10/1988 | Solomon |
| 4,843,529 A | 6/1989 | Izenour |
| 4,890,208 A | 12/1989 | Izenour |
| 5,079,544 A | 1/1992 | DeMond et al. |
| 5,083,857 A | 1/1992 | Hornbeck |
| 5,096,279 A | 3/1992 | Hornbeck et al. |
| 5,105,299 A | 4/1992 | Anderson et al. |
| 5,192,946 A | 3/1993 | Thompson et al. |
| 5,285,363 A | 2/1994 | Meuse |
| 5,311,349 A | 5/1994 | Anderson et al. |
| 5,467,146 A | 11/1995 | Huang et al. |
| 5,535,047 A | 7/1996 | Hornbeck |
| 5,548,443 A | 8/1996 | Huang |
| 5,583,688 A | 12/1996 | Hornbeck |
| 5,590,955 A * | 1/1997 | Bornhorst et al. .......... 362/324 |
| 5,600,383 A | 2/1997 | Hornbeck |
| 5,612,753 A | 3/1997 | Poradish et al. |
| 5,617,243 A | 4/1997 | Yamazaki et al. |
| 5,633,755 A * | 5/1997 | Manabe et al. ............. 359/443 |
| 5,658,063 A | 8/1997 | Nasserbakht |
| 5,670,977 A | 9/1997 | Chiu et al. |
| 5,680,257 A | 10/1997 | Anderson |
| 5,706,061 A | 1/1998 | Marshall et al. |
| 5,796,526 A | 8/1998 | Anderson |
| 5,828,485 A | 10/1998 | Hewlett |
| 5,905,545 A * | 5/1999 | Poradish et al. ............ 348/743 |
| 5,909,204 A * | 6/1999 | Gale et al. .................... 345/85 |
| 5,967,636 A * | 10/1999 | Stark et al. ................... 353/84 |
| 5,988,817 A * | 11/1999 | Mizushima et al. .......... 353/94 |
| 6,049,317 A * | 4/2000 | Thompson et al. ........... 345/85 |
| 6,072,545 A * | 6/2000 | Gribschaw et al. ......... 348/756 |
| 6,155,687 A * | 12/2000 | Peterson ...................... 353/84 |
| 6,220,730 B1 * | 4/2001 | Hewlett et al. ............. 362/297 |
| 6,254,239 B1 * | 7/2001 | Hibner, II et al. ............ 353/94 |
| 6,362,797 B1 * | 3/2002 | Dehmlow .................... 345/32 |
| 6,412,972 B1 * | 7/2002 | Pujol et al. ................. 362/272 |
| 6,538,705 B1 * | 3/2003 | Higurashi et al. .......... 348/745 |

* cited by examiner

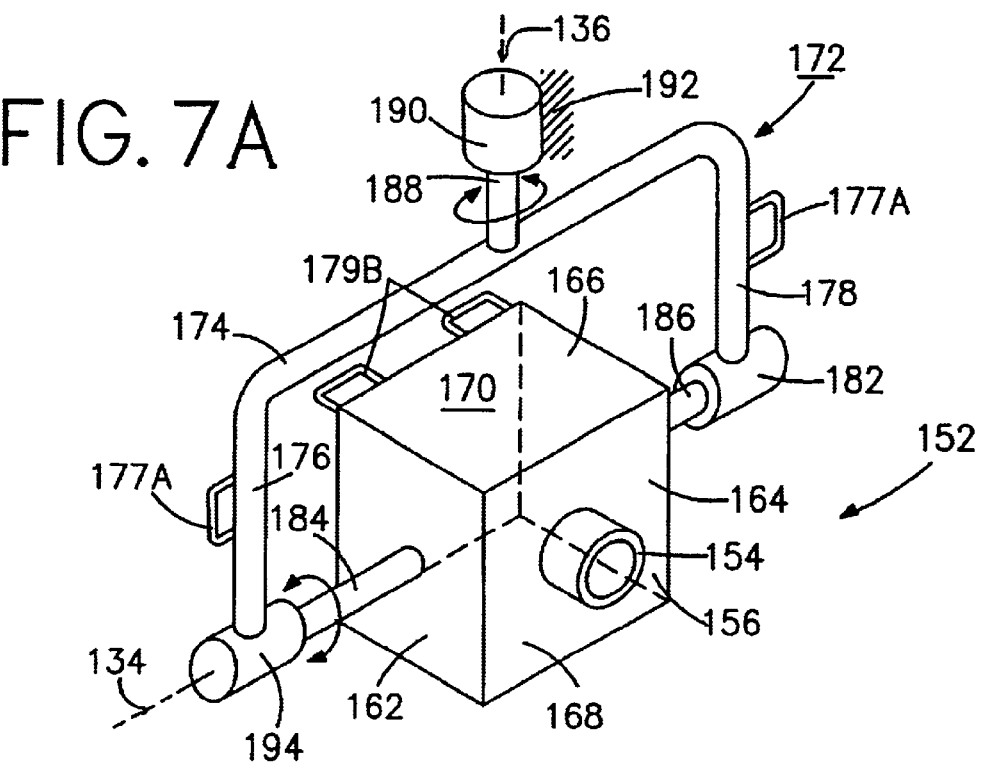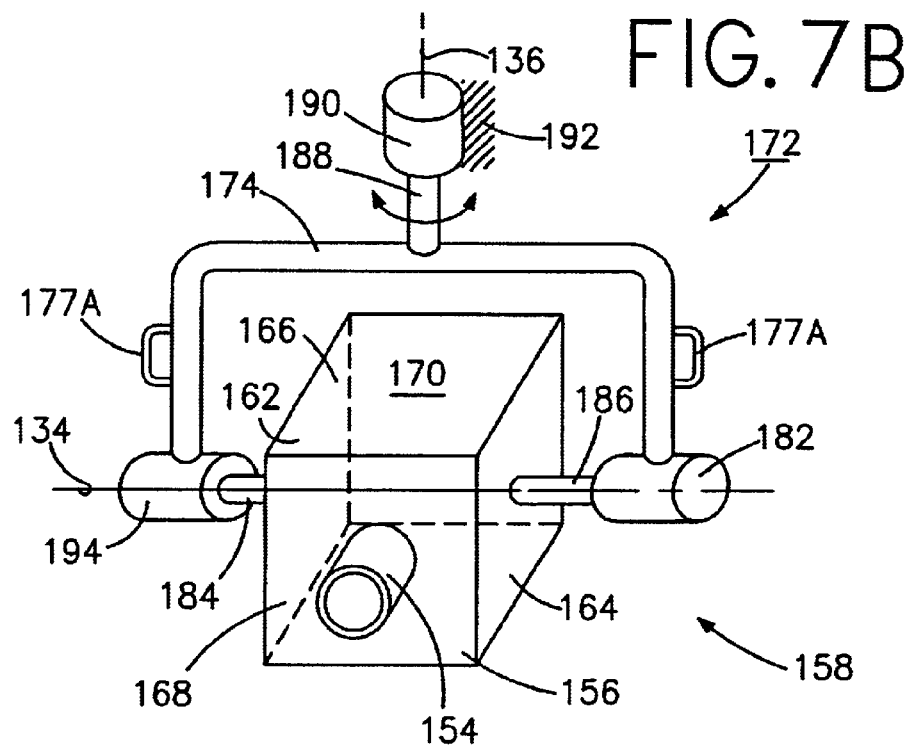

DIGITAL MICROMIRROR STAGE LIGHTING SYSTEM

FIELD OF THE INVENTION

This invention relates in general to lighting for stage productions and more particularly to image projection onto a stage.

BACKGROUND OF THE INVENTION

Lighting for stage productions, especially lighting for large scale productions for mass audiences such as rock concerts that require highly charged, intense atmospheres, is generally based upon a dual lighting system. The basic lighting is the spotlight that illuminates the performers as they move around the stage. In backup tandem with the spotlight is an image-casting lighting system that projects onto the stage continuous moving images that are aimed at a display area of the stage. The present system of moving image projection uses the common film projector used in movie theaters.

The spotlight luminaire and the associated beam modification devices such as the lens and an optional color wheel are presently mounted in a single spotlight housing that is compact and of such a weight that it can be moved about horizontal and vertical axes that enable the spotlight to cast its beam upon and follow a performer about the stage. In large scale stage productions exemplified by rock concerts the movements of the housing for the spotlight is motor driven in conjunction with a computer program created for the particular show so that the beam is moved about the stage in predetermined areas. The performer in turn has been rehearsed to move about the stage in synchronization with the beam so that what appears to be spontaneous movements by the performer are in fact based upon the performer anticipating the automatic placements of the spotlight.

In contrast with the dynamic flow of the performer and the spotlight beam is the static situation of moving image projection. Film projectors are much too heavy to be placed in a housing that can be moved either horizontally or vertically much less a combination of both. In present stage productions a film projector is placed upon a table, and a luminaire casts the beam of the moving images through the moving film in a manner known in the art onto a stage display, generally a rear surface of the stage. The static nature of such a moving image display cannot be overcome by the moving images themselves since the display itself must be stationary. This static effect is not in harmony with the effect of highly charged energy that accompanies and enhances the music of rock concerts.

A recent innovation in image display is the digital micromirror device or deformable mirror device (DMD) that is in the general field known as the spatial light modulator (SLM). In general, the DMD is a Micro-Opto-Electro-Mechanical Structures (MOEMS) device that is used for a high quality projection. An early version of the DMD is described in U.S. Pat. No. 4,662,746 issued to Hornbeck on May 5, 1987. This invention describes an array of mirror elements, described therein as pixels, that are cantilevered by addressing electric circuitry and resulting electrostatic force that induces a mirror cell position that reflects a light beam from a direction away from a display to a mirror cell position that directs a reflected digital light beam onto a display. This patent is incorporated by reference into the present application.

Improvements to the early DMDs are described in particular in U.S. Pat. No. 5,083,857 issued to Hornbeck on Jan. 28, 1992, U.S. Pat. No. 5,535,047 issued to Hornbeck on Jul. 9, 1996, and U.S. Pat. No. 5,600,383 issued to Hornbeck on Feb. 4, 1997, which describe a DMD pixel array that includes each mirror attached to an underlying yoke connected to torsion hinges. These named patents are incorporated by reference into the present application and made a part of herein.

The entire mirror array of the DMD is basically of one unit with the cell mirrors being addressed by circuitry and electrodes. The mirrors are bistable and movable at digital rates far in excess of the critical flicker frequency (CFF) of the human eye. In the DMD projection system, the human eye acts as the final digital signal to analog signal converter for transmission to the human brain. Electronic circuitry and receiver, converter, memory, and processor coupled to the DMD are described in U.S. Pat. No. 5,079,544 issued to DeMond and Thompson on Jan. 7, 1992 and in U.S. Pat. No. 5,192,946 issued to Thompson and DeMond on May 9, 1993. These patents are incorporated by reference into and are made a part of the present application.

In addition, U.S Pat. Nos. 4,441,791; 4,710,732; 4,596,992; 4,615,595; 4,662,746 issued to Hornbeck showing deformable digitally addressable mirrors are incorporated by reference into the present application.

U.S. Pat. No. 5,658,063 issued to Nasserbakht on Aug. 19, 1997 describes a video projection device for projecting video images onto a surface. A discussion therein of FIG. 8 therein, lines 43–67 and page 8, lines 1–35, describes a video projection system that includes a digital light processing system as described in U.S. Pat. No. 5,192,946, which has already been incorporated by reference herein.

Other patents concerning DMD technology that have general relationship to the present invention are as follows:

U.S. Pat. No. 4,566,935 on Jan. 28, 1986
U.S. Pat. No. 4,615,555 issued on Oct. 7, 1986
U.S. Pat. No. 4,662,746 issued on May 7, 1987
U.S. Pat. No. 5,583,688 issued on Dec. 10, 1996, 1987

Patents concerning DMD technology that have general relationship to the present invention in the area of optics are as follows:

U.S. Pat. No. 5,105,299 issued on Apr. 14, 1993
U.S. Pat. No. 5,311,349 issued on May 10, 1994
U.S. Pat. No. 5,467,146 issued on Nov. 14, 1995
U.S. Pat. No. 5,548,443 issued on Aug. 20, 1996
U.S. Pat. No. 5,612,753 issued on Mar. 18, 1997
U.S. Pat. No. 5,670,977 on Sep. 23, 1997
U.S. Pat. No. 5,680,257 issued to Oct. 21, 1997
U.S. Pat. No. 5,706,061 issued on Jan. 6, 1998
U.S. Pat. No. 5,796,526 issued on Aug. 18, 1998

Some of the basic advantages of DMD technology are being fully digitized, having greater resolution than the prior art, being highly adaptable to large scale displays, cost effective, and light weight.

Although all the listed advantages of DMD technology are highly desirable, the fact that the DMD is light weight makes it particularly suitable for replacing the heavy weight film projector used for stage productions. The DMD along with a light source, a coloring device and a lens system can be mounted in a housing light enough to be rotated, that is, panned and tilted, about one or two axes either by hand or by a driver to create a moving image beam that is as mobile and as directable as the spotlight beam.

Coloring of a white light source can be achieved in the digitized light beam by any of several means known in the art. Various types of color wheels can be used in a manner known in the art. In addition, a spinnable color wheel having a wide range of colors can be digitized at a greater rate than the CFF of the human eye. Coloring of a digitized light beam can also be achieved by a single laser or a three-way laser of the three primary colors. Such coloring techniques are described in U.S. Pat. No. 5,079,544 and U.S. Pat. No. 5,192,946, page 14, line 30–49, earlier incorporated herein and made a part of the present application. Coloring of a single laser light beam can be achieved by digitizing the single laser at a frequency less than the color integration time for color for the human eye. A discussion of the integration time for the human eye for color, which differs from the CFF of the human eye, is set forth on page 12, lines 61–68, of U.S. Pat. No. 5,192,946.

Other structures can be used to add coloring to the DMD light display systems. Beam-splitting prisms can split white light into various components of the visible electromagnetic spectrum as described in the following paper: "Display System Architectures for Digital Micromirror Device (DMD™)Based Projectors," by James M. Florence and Lars A Yoder, SPIE, Vol. 2650, pp. 193–208 (1996), which is incorporated into and made a part of the present application.

Technical papers describing DMD technology are as follows:

"Digital Light Processing™ for High-Brightness, High-Resolution Applications," by Larry J. Hornbeck, Texas Instruments 1997, Product # DPL-0030, Digital Video Products"

"Digital High-Brightness, High-Resolution Applications," by Larry J. Hornbeck, in Electronic Imaging, EI, Projection Displays III, co-sponsored by IS&T and SPIE, 10–12 Feb. 1997, San Jose, Calif. The above articles are incorporated into and made a part of the present application.

SUMMARY OF THE INVENTION

The present invention provides a light display system for projecting onto a stage display a digitally generated light beam having the optical effect of a continuous moving image in which objects move that includes a housing rotatable about a horizontal axis and a vertical axis, a deformable mirror device (DMD) having a surface comprising an array of deformable mirror cells, or pixel mirrors, or pixels, the DMD being mounted in the housing. A lamp is mounted in the housing for directing a beam of light to impinge upon the pixel surface of the DMD. A first driver rotates the housing about a horizontal axis, and a second driver rotates the housing about a vertical axis. Digital control signals to the DMD activate selected pixels of the DMD to reflect digital imaged light beams to the stage display. The light source can be either standard lamps or arc lamps or lasers. Color is achieved by a color wheel, by lasers, or by chromatic prisms or a combination of chromatic prisms and a color wheel.

Analog data when that is the basic available data is converted to digital data at a video signal analog-to-digital image data converter. The digital image data is then prepared for application to a DMD at a DMD digital formatter. Once digital formatting is accomplished, control signals are directed to the addressing circuitry for the DMD. The DMD includes a mechanical interface and digital optics, which includes a plurality of bistable pixels. Control signals written to the addressing circuitry directs the DMD mechanical interface that controls the bistable rotations of the array of pixel mirrors that comprise the surface of the DMD. In addition the optics include color combinations associated with a color wheel or beam-splitting prisms mounted in the housing are created as directed by signals from the computer that are written to the addressing circuitry including each Static Ram (SRAM) of each DMD in synchronization with the rotations of the pixel mirrors.

The present invention will be better understood and the main objects and important features, other than those enumerated above, will become apparent when consideration is given to the following details and description, which when taken in conjunction with the annexed drawings, describes, discloses, illustrates, and shows the preferred embodiments or modifications of the present invention and what is presently considered and believed to be the best mode of practice in the principles thereof. Other embodiments or modifications are intended to be reserved especially as they fall within the scope and'spirit of the subjoined claims.

BRIEF DESCRIPTION OF THE DRAWINGS

FIG. 7A is a simplified perspective view of the rotatable housing with the luminaire and DMD shown in FIGS. 4 and 5 in a first position wherein the projector directs a digital light beam onto a first screen area shown in FIG. 3;

FIG. 7B is a simplified perspective view of the rotatable housing with the luminaire and DMD shown in FIG. 3 in a second position wherein the projector directs the digital light beam onto a second screen area shown in FIG. 3;

DESCRIPTION OF THE PREFERRED EMBODIMENTS

Figure 1:
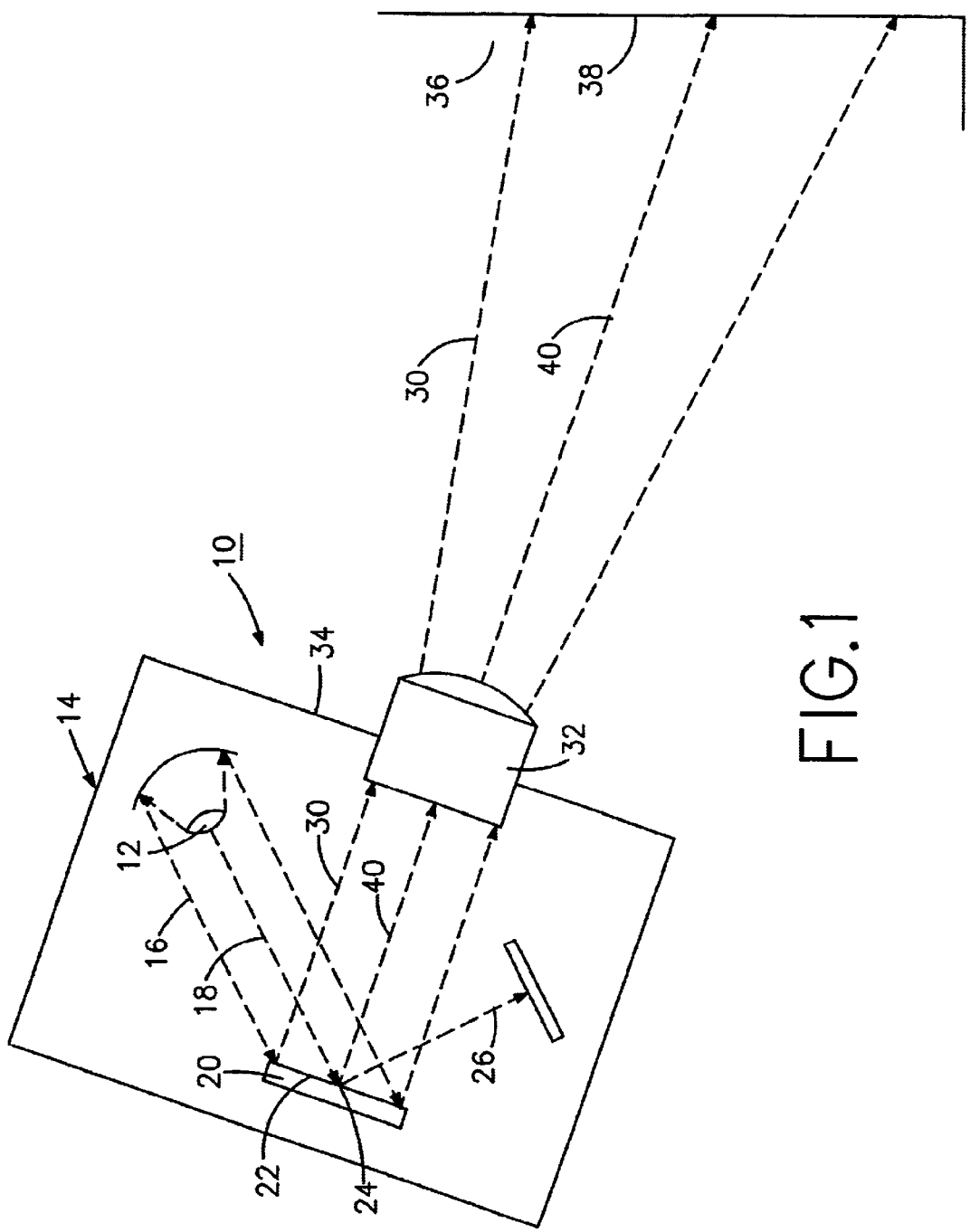
FIG. 1 is a schematic sectional side view of a basic embodiment of the present invention including a light source and a DMD mounted in a rotatable housing.

Reference is now made to the figures and in particular to FIGS. 1–16 in which identical or similar parts are designated by the same reference numeral throughout.

A light display system 10 shown in a basic schematic architecture shown in FIG. 1 includes a lamp 12 mounted within a housing 14. An analog light beam 16 generated by lamp 12 containing a centrally located analog light ray 18 is directed at a deformable mirror device, or digital micromirror device (DMD), 20 that includes by a surface array 22 of a plurality of pixel mirrors, or pixels, indicated herein as a single exemplary pixel 24 aligned with and impinged upon by light ray 18. All pixels 24 are bistable and rotatable between two reflecting direction positions by selective application of addressing digitized circuitry potential and addressing electrodes contained in DMD 20 that determine which way each pixel mirror 24 will rotate. The rate of rotation of each pixel mirror 24 is controlled by the digitized circuitry and addressing electrodes of DMD 20 in a manner known in the art in particular as described in the patents referred to previously and incorporated herein by reference with the result of a digitized number of rotations per unit time of each addressed plurality of pixel mirrors 24 as being of an order much greater than the critical frequency flicker (CFF) than the human eye as described in U.S. Pat. Nos. 5,079,544 and 5,192,946, referred to previously and incorporated by reference into the present application.

Light beam 16 impinges upon surface array 22 and is either 1) deflected therefrom in one position of each pixel 24 in one direction as a plurality of non-image forming light rays exemplified by non-image light ray 26 that is deflected from pixel 24 that is directed to an opaque light stop 28 that is mounted within housing 14 or 2) is reflected from surface array 22 as an image-forming digitized light beam 30 that is directed through a projection lens 32 mounted in the front wall 34 of housing 14 onto a stage display 36. Stage display 36 can be of various configurations and is shown in the schematic rendering of FIG. 1 as a vertical surface that is indicated as a vertical stage display screen 38. Reflected digitized light beam 30 contains a digitized light ray 40 that is shown in FIG. 1 as being exemplary of a plurality of digitized light rays contained in digitized light beam 30 reflected from those particular pixels 24 comprising surface array 22 that have been selected for reflected activation by the addressing circuitry of DMD 20. Digitized light beam 30, which is an image-forming digitized light beam, and digitized light ray 40 are in general continuations of analog light beam 16 and exemplary analog light ray 18.

As described in U.S. Pat. Nos. 5,535,047, 5,583,688 and 5,600,383 mentioned earlier herein and other referenced patents, digitized light beam 30 is generated by digitally activating preselected digital signals providing digital control signals to DMD 20 for digitally activating selected deformable mirror pixels 24 to reflect digitally selected light beams onto stage display 36 in accordance with control circuitry contained in a computer 42, shown in FIGS. 4 and 5, that is connected to addressing circuitry contained in DMD 20. The control circuitry provides address data to the digital addressing circuitry and a plurality of address electrodes at each pixel 24 of array 22 of DMD 20. These digital signals provide digital control signals to each pixel mirror 24 for digitally activating selected deformable pixel mirrors 24 to direct digitally generated light beam 30 onto stage display 36 so as to create the optical effect to a human eye of a continuous moving picture or plurality of images in which objects appear to move. The continuous moving picture may be of a nature known to the art in films or the continuous moving picture may be of a purely decorative nature. Merely for purposes of verbal examples, the continuous moving picture may be cascading waters or a running animal, and the continuous moving picture may be of flowers bursting into bloom or artistic continuously changing designs. The projection of immobile designs or images that appear to be immobile is possible at times, but the projections of still images are nonetheless accomplished by DMD 20 projecting repetitive digitally generated light beams 30 onto stage screen 38 to create an illusion of an immobile image.

Figure 2:
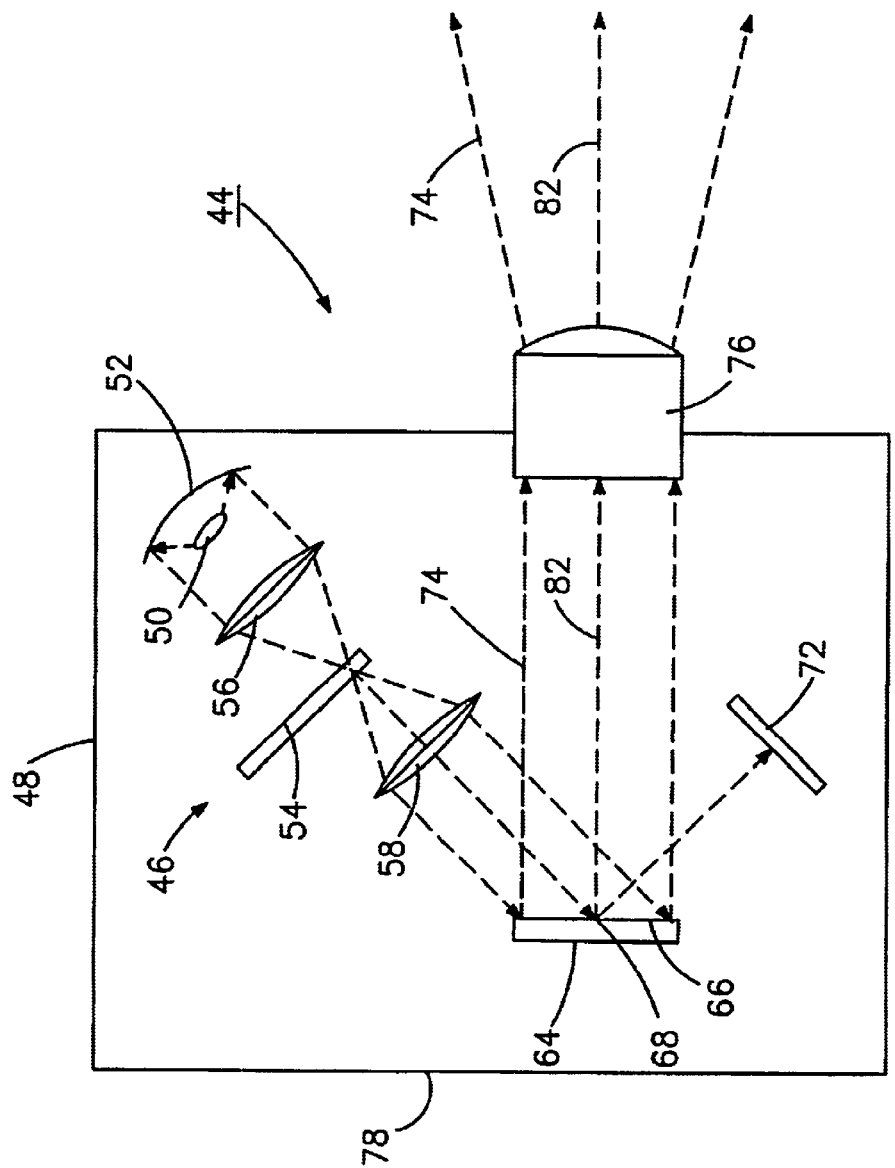
FIG. 2 is a schematic sectional side view of an embodiment of the present invention analogous to that shown in FIG. 1 further including a color wheel positioned between focusing lenses mounted between the light source and the DMD.

A light display system 44 basically analogous to light display system 10 shown in FIG. 1 is shown in FIG. 2 with a luminaire 46 mounted in a housing 48. The term luminaire as used herein is defined as a complete lighting unit comprising a lamp 50, a lamp reflector 52, a color wheel 54 positioned between a pair of first and second focus lenses 56 and 58 together with other parts designed to position and protect lamp 50 and to connect lamp 50 to the power supply.

An analog light beam 60 generated by lamp 50 containing a centrally located analog light ray 62 is directed at a DMD 64 that is defined by a surface array 66 of a plurality of pixel mirrors, or pixels, indicated herein as a single exemplary pixel 68 aligned with and impinged upon by light ray 62. All pixels 68 are bistable and rotatable between two reflecting direction positions by selective application of addressing digitized circuitry potential and addressing electrodes contained in DMD 64 that determine which way the each pixel mirror 68 will rotate. The rate of rotation of each pixel mirror 68 is controlled by the digitized circuitry and addressing electrodes of DMD 64 in a manner known in the art in particular as described with reference to light display system 10 described in relation to FIG. 1.

Light beam 60 impinges upon surface array 66 and is either 1) deflected therefrom in one position of each pixel 68 in one direction as a plurality of non-image forming light rays exemplified by light ray 70 that is deflected from pixel 68 that is directed to an opaque light stop 72 that is mounted within housing 48, or 2) is reflected from surface array 66 as a reflected image-forming digitized light beam 74 that is directed through a projection lens 76 mounted in the front wall 78 of housing 80 onto a stage display (not shown) such as stage display 36 shown in FIG. 1.

Reflected digitized light beam 74 contains a digitized light ray 82 that is shown in FIG. 2 as being exemplary of a plurality of digitized light rays contained in digitized light beam 74 reflected from those particular pixels 68 comprising surface array 66 that have been selected for reflected activation by the addressing circuitry of DMD 64. Digitized light beam 74 and in particular those digitized light rays 82 selected as image-forming light rays are in general continuations of analog light beam 60.

Figure 3:
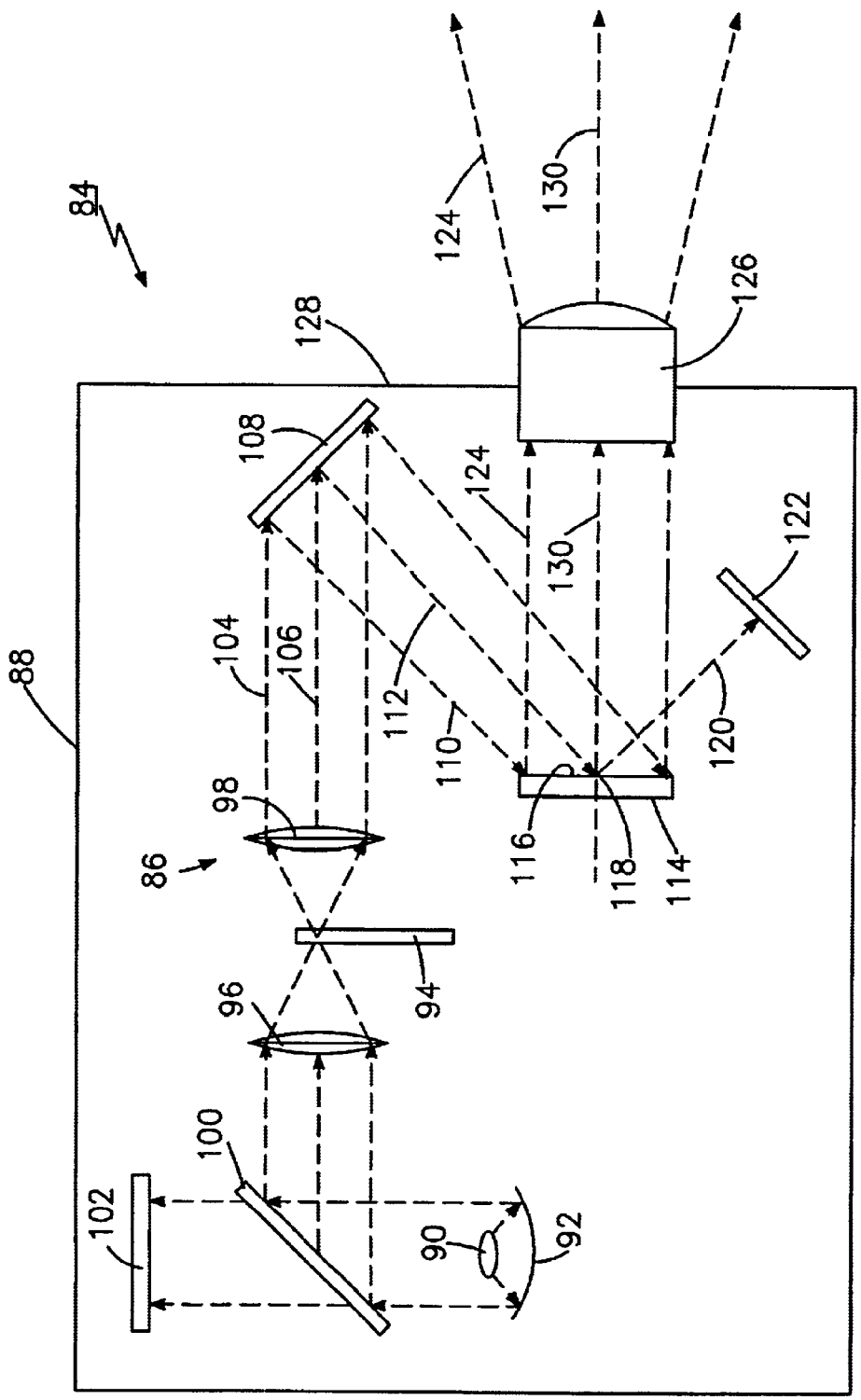
FIG. 3 is a schematic sectional side view of an embodiment analogous to that shown in FIG. 2 further including a fold mirror and a cold mirror and a heat sink.

A light display system 84 basically analogous to light display systems 10 and 44 shown in FIGS. 1 and 2 is shown in FIG. 3 with a luminaire 86 mounted in a housing 88. Luminaire 86 comprises a lamp 90 with reflector 92, a color wheel 94 positioned between a pair of focus lenses 96 and 98, a cold mirror 100 and a heat sink 102. An analog light beam 101 generated by lamp 90 is directed at cold mirror 100 which passes non-visible spectrum beam 103 to heat sink 102. Cold mirror 100 also reflects analog light beam 101 as beam 105 to focus beam 98, which directs a beam through color wheel 94 to lens 98.

An analog light beam 104 from locus lens 98 generated by lamp 90 containing a centrally located analog light ray 106 is directed at a fold mirror 108 that is included as a device that shortens the length of light beams and so reduces the size of housing 88 as is known in the art. Fold mirror 108 reflects another analog light beam 110 containing an exemplary light ray 112 to a DMD 114 that is defined by a surface array 116 of a plurality of pixel mirrors, or pixels, indicated herein as a single exemplary pixel mirror 118 aligned with and impinged upon by light ray 112.

Light beam 110 impinges upon surface array 116 and is either 1) deflected therefrom in one position of each pixel mirror 118 in one direction as a plurality of non-image forming light rays exemplified by a deflected light ray 120 that is deflected from pixel 118 that is directed to an opaque light stop 122 that is mounted within housing 88, or 2) is reflected from surface array 116 as a reflected image-forming digitized light beam 124 that is directed through a projector lens 126 mounted in the front wall 128 of housing 88 onto a stage display (not shown) such as stage display 36 shown in FIG. 1.

Reflected digitized light beam 124 contains a digitized light ray 130 that is shown in FIG. 3 as being exemplary of a plurality of digitized light rays contained in digitized light beam 124 reflected from those particular pixels 118 comprising surface array 116 that have been selected for reflected activation by the addressing circuitry of DMD 114. Digitized light beam 124 and in particular those digitized light rays 130 selected as image-forming light rays are in general continuations of analog light beams 104 and 110.

Figure 4:
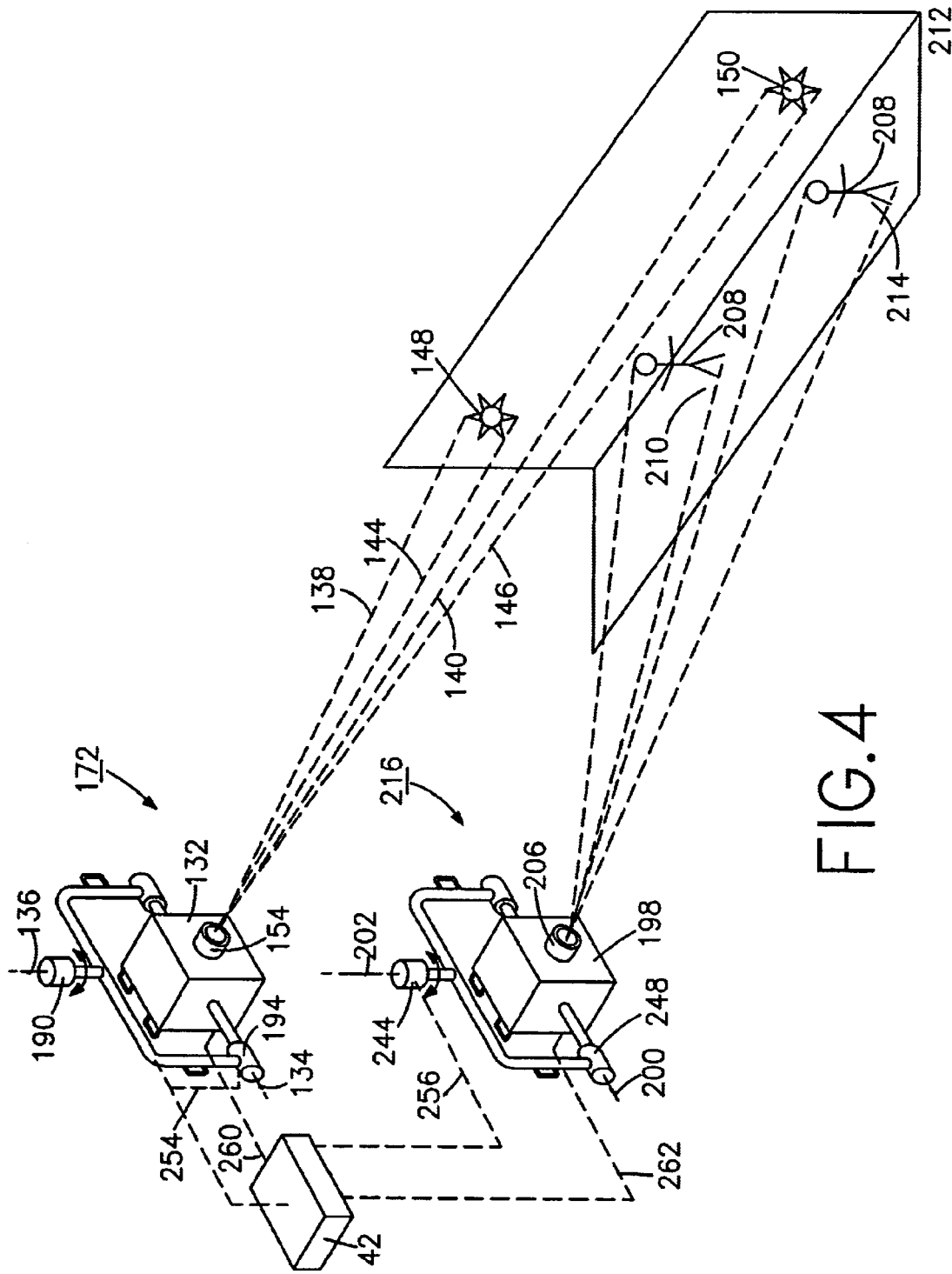
FIG. 4 is a schematic sectional side view perspective rendering of a rotatable housing containing a DMD shown in FIGS. 1, 2 and 3 including a luminaire projecting digital imaged light beams onto a perspective view of a stage and stage screen with the stage rotated for purposes of exposition with the digital light beams creating the optical effect of moving images over various areas of the stage screen together with a perspective view of a standard rotatable spotlight housing projecting a spotlight beam upon a stage performer and further showing a synchronizing computer for both the DMD housing and luminaire and the spotlight housing and luminaire.
Figure 5:
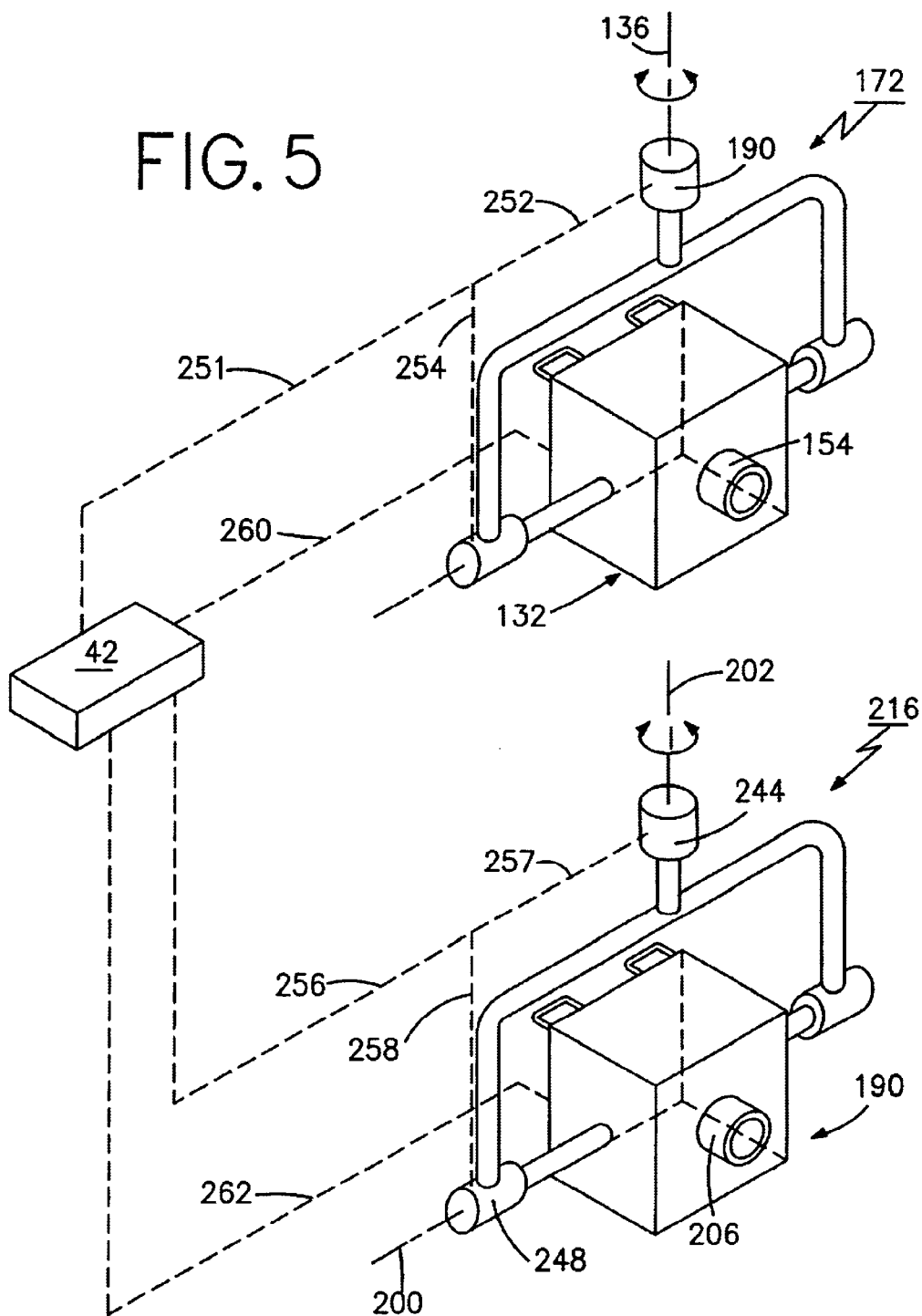
FIG. 5 is an enlarged isolated perspective view of both the rotatable DMD housing for projecting a digital beam and the rotatable spotlight housing and the synchronizing central processing unit shown in FIG. 4.

Housings 14, 48 and 88 of light display systems 10, 44, and 84 are shown as a DMD housing 132 in FIGS. 4 and 5 rotatable either about a horizontal X-axis 134 or about a vertical Y-axis 136 or are rotatable about both X-axis 134 and Y-axis 136.

In accordance with the present invention as shown in FIG. 4, a rotational pan and/or tilt of housing 132 about the horizontal X-axis 134 and/or about the vertical Y-axis 136 upwardly or downwardly or to the left or right, respectively, results in the raising or lowering and/or the leftward or rightward movement of digitized light beams directed from a light system contained in housing 132. Specifically, rotational movement, or tilting, of housing 132 about X-axis 134 upward or downward results in the two digitized light beams emanating from housing 132 indicated as upwardly turned digitized light beam 138 or downwardly turned digitized light beam 140 each shown striking vertical stage screen 142. Rotational movement, or panning, of housing 132 about vertical Y-axis 136 to the left as viewed from housing 132 or the right as viewed from housing 132, results in a leftward panning or a rightward panning, respectively, of housing 132 and so results in the two digitized light beams emanating from housing 132 indicated as leftward turned digitized light beam 144 or rightward turned digitized light beam 146 each shown striking vertical stage screen 142. For purposes of exposition, raised light beam 138 and leftward turned light beam 144 are shown having the same optical path, and lowered light beam 140 and rightward turned light beam 146 are shown as having the same optical path and are indicated as raised/leftward light beam 138/144 and lowered/rightward light beam 140/146.

Light beam 138/144 strikes against stage screen 142 so as to generate the optical effect thereon of a moving image 148. Light beam 140/146 strikes against stage screen 142 so as to generate the optical effect of an image 150. Images 148 and 150 here shown in a moment of time for purposes of exposition but herein represent instantaneous captures of a continuous flow of a digital light beam emanating from the light display system contained within housing 132 creating a continuous flow of the optical effects of digitally generated moving images occupying a continuous flow of areas across stage screen 142. Each image 148 and 150 represents herein a moving image being moved across stage screen 142 between the positions shown for each image 148 and 150, either being raised or lowered or moved rightward or leftward. Moving images 148 and 150, each shown as stated in instantaneous immobility, are positioned with image 148 higher and leftward relative to image 150, that is, with image 150 lower and rightward relative to image 148. Images 148 and 150 are shown in FIG. 4 to display moving or changing patterns on screen 142, with image 148 being a five-petaled flower and image 150 being a four-petaled flower. Selected pixels of the DMD mounted in housing 132, shown as pixels 24, 68, and 118 of DMDs 20, 64, and 114, respectively, can be deflected away from screen 142 so that the optical effect of moving images 148 and 150 are isolated unframed on screen 142 and as housing 132 is moved relative to X-axis 134 and Y-axis 136, the moving images reflected from screen 142 can give the optical illusion of isolated moving images moving across stage screen 142.

The size of images 148 and 150 relative to the size of screen 142 can vary in accordance with various factors including the design dimensions of the luminaire and the DMD and projector lens associated with and the distance between housing 132 and screen 142.

FIGS. 7A and 7B show housing 132 in the two housing positions described and indicated in relation to light beams 138/144 and 140/146 in FIG. 4 with the two actual positions of the housing 88 in FIG. 4 being shown. Housing 132 is representative of housings 14, 48 and 88 of light display systems 10, 44 and 84. In further explication of the positions of housing 132 in FIG. 4, housing 132 is illustrated in FIG. 7A in a first housing position 152 that is compatible with projector lens 154 mounted in front wall 156 directing light beam 138/144 onto screen 142 as image 148. Housing 132 is illustrated in FIG. 7B in a second housing position 158 that is compatible with projector lens 154 directing light beam 140/146 onto screen 142 as image 150.

Housing 132 includes a rear wall 160 opposed to front wall 156, a pair of opposed left and right side walls 162 and 164, respectively, connected to front and rear walls 156 and 160, and a pair of opposed top and bottom walls 166 and 168, respectively, connected to front and rear walls 156 and 160 and left and right side walls 162 and 164 so as to define an inner chamber 170 wherein is mounted the formerly described DMDs 20, 64 and 114 with supporting DMD systems and light source systems.

A Y-axis/X-axis pan and tilt mechanism 172 includes a horizontal bar 174 extending laterally over top wall 166 of housing 132 has opposed ends from which descend vertical bars 176 and 178 that are connected to slip grips 180 and 182 within which opposed horizontal left and right support bars 184 and 186, respectively, are secured to opposed generally upright left and right side walls 162 and 164, respectively. Projector lens 154 extends through front wall 156, which extends between left and right side walls 162 and 164. A vertical upwardly extending support bar 188 connected to the mid area of horizontal bar 174 is secured to a Y-axis driver 190 that is secured to a fixed structure 192 that is turn partially supports housing 132. Left horizontal bar 184 is secured to an X-axis driver 194 that is secured to a fixed structure 196. Activation of Y-axis driver 190 causes vertical support bar 188 to rotate in either of two directions about Y-axis 136 in predetermined and particular rotational movements in response to signals from computer 42 (FIGS. 4 and 5) with the result that projector lens 154 directs leftward digitized light beam 144 onto stage screen 142 in FIG. 7A and directs rightward digitized light beam 146 onto stage screen 142 in FIG. 7B. Activation of X-axis driver 194 causes left horizontal bar 184 to rotate in either of two directions about X-axis 134 in predetermined rotational movements in response to control signals from computer 42 with the result that projector lens 154 directs raised digitized light beam 138 onto stage display screen 142 in FIG. 7A and further directs lowered digitized light beam 140 onto stage screen 142 in FIG. 7B. Luminance is controlled by digital control signals sent from the computer 42 that are written to each Static Ram (SRAM) of each DMD 20, 64 and 114.

FIGS. 7A and 7B show housing 132 with an optional pair of handgrips 177A secured to each vertical bar 176 and 178, respectively, provided to give an operator the option of rotating housing 132 about Y-axis 190. Another pair of handgrips 179A and 179B are connected to the top area of rear wall 160 provided to give an operator the option of rotating housing 132 about X-axis 134.

A spotlight housing 198 shown in FIG. 4 and in isolated detail in FIG. 5 is positioned on a horizontal level below housing 132 in a manner known in the art of stage lighting. Spotlight housing 198 can be panned and tilted around an X-axis 200 and a Y-axis 202 and is shown in FIG. 4 for purposes of exposition as projecting a spotlight beam in two-different housing positions relative to X-axis 200 and Y-axis 202. Spotlight housing 198 has mounted therein a spotlight system (not shown) that directs spotlight beam 204 through a spotlight housing projector lens 206 onto and thus illuminates a stage performer 208 standing in a first stage location 210 on stage floor 212 and further directs the same spotlight beam 204 onto stage performer 206 standing in a second stage location 214 on stage floor 212 also for purposes of illumination. As stage performer 208 moves about stage floor 212 between stage locations 210 and 214, spotlight housing 198 is panned and tilted about X-axis 200 and Y-axis 202 so that spotlight beam 204 always illuminates stage performer 208.

As shown in FIGS. 4 and 5, spotlight housing 198 can be panned and tilted about X-axis 200 and Y-axis 202 by an X-axis/Y-axis pan and tilt mechanism 216. The positions of spotlight housing 198 in various panned and tilted, that is, raised, lowered, or turned rightward or leftward positions are not shown since such are well-known in the art. Pan and tilt mechanism, 216 is one type of such mechanism known in the art and includes a horizontal bar 218 extending laterally over top wall 220 of spotlight housing 198 and has opposed ends from which descend vertical bars 222 and 224 that are connected to slip grips 226 and 228 within which opposed horizontal left and right support bars 230 and 232 are secured to opposed generally upright left and right side walls 234 and 236, respectively. Projector lens 206 extends through a front wall 238, which extends between left and right side walls 234 and 236 and is opposed to a rear wall 240. A vertical upwardly extending support bar 242 connected to the midarea of horizontal bar 218 is secured to a Y-axis driver 244 that is secured to a fixed structure 246 that is turn partially supports spotlight housing 198. Left horizontal support bar 230 is secured to an X-axis driver 248 that is secured to a fixed structure 250. Activation of Y-axis driver 244 causes vertical support bar 242 to rotate in either of two directions about Y-axis 202 in predetermined and particular rotational movements in response to signals from computer 42 (FIGS. 4 and 5) with the result that projector lens 206 directs spotlight beam 204 onto stage performer 208 in first and second locations 210 and 214 in FIG. 4. Activation of X-axis driver 248 causes left horizontal bar 230 to tilt in either of two directions about X-axis 200 in predetermined rotational movements in response to control signals from computer 42 with the result that projector lens 206 directs spotlight beam 204 onto stage performer 208 in first and second locations 210 and 214 in FIG. 4. First and second locations 210 and 214 of stage performer 208 are shown in different lateral locations and in different depth locations relative to stage floor 212 so that Y-axis and X-axis drivers 244 and 248 are activated by computer 42 to direct spotlight beam 204 onto stage performer 208 in a manner known in the art, or as is more usual in the art, to direct spotlight beam 204 to predetermined locations that stage performer 208 knows in advance and to where he places himself in prior rehearsed anticipation of such predetermined locations.

FIGS. 4 and 5 show control signals from computer 42 by way of a main bus 251 and a bus 252 to Y-axis driver 190 and by way of bus 251 and a bus 254 to X-axis driver 194 for signaling Y-axis driver 190 and X-axis driver 194 for panning and tilting of DMD housing 132 around X-axis 134 and Y-axis 136. In addition, computer 42 also sends control signals by way of a main bus 256 and a bus 257 for signaling Y-axis driver 244 and by main bus 256 and a bus 258 to X-axis driver 248 for panning and tilting of spotlight housing 198 around X-axis 200 and Y-axis 202. Optional control signals from computer 42 via main bus 256 and bus 257 can synchronize the rotational movements of DMD housing 132 and spotlight housing 198.

FIGS. 4 and 5 also show control signals from computer 42 by way of a bus 260 to DMD housing 132 that are directed to the addressing circuitry of the DMD therein of light display systems 10, 44, and 84; and also are directed to coloring devices, for example, color wheels 54 and 94 of light display systems 44 and 84. See FIG. 13. Control signals from computer 42 are directed by way of a bus 262 to the addressing DMD circuitry therein of spotlight housing 198 and also are directed to coloring devices such as color wheels analogous to color wheels 54 and 94. Coloring devices of DMD housing 132 and spotlight housing 198 are optionally synchronized with the respective panning and tilting of DMD housing 132 and of spotlight housing 198.

Figure 6:
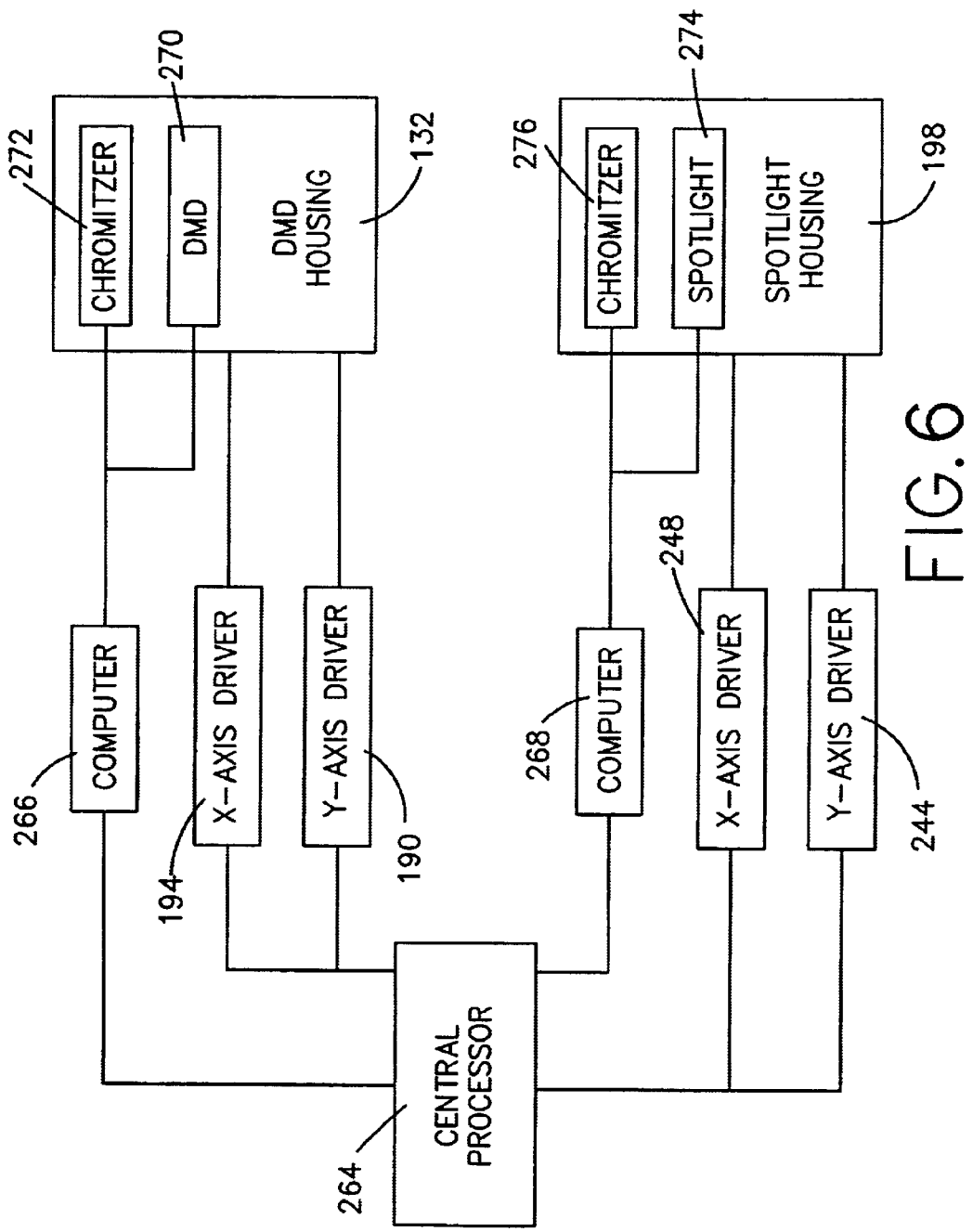
FIG. 6 is a block diagram of the combination of control signals to the rotatable DMD housing, the DMD housing driver, and the DMD with the simultaneous combination of control signals to the spotlight housing, the spotlight housing driver, and the spotlight shown in FIGS. 4 and 5 and further showing a central processor with subprocessors.

FIG. 6 details the functions of computer 42 separated into a central processor 264 in signal connection with a first computer 266 and a second computer 268. First computer 266 is in signal connection with 1) a DMD 270 mounted in DMD housing 132, and 2) a coloring device 272, such as color wheels 54 and 94 of light display systems 44 and 84, mounted in DMD housing 132. Second computer 268 is in signal connection with 1) a spotlight 274 mounted in spotlight housing 198, and 2) a color device such as color wheels 54 and 94 of light display systems 44 and 84, mounted in spotlight housing 198.

Central processor 264 is also in signal connection with Y-axis driver 190 and with X-axis driver 194 for panning and tilting DMD housing 132 about X-axis 134 and Y-axis 136. Also, central processor 264 is in signal connection with Y-axis driver 244 and with X-axis driver 248 for panning and tilting spotlight housing 198 about X-axis 200 and Y-axis 202.

Central processor 264 can be programmed to synchronize all the functions associated with both DMD housing 132 and spotlight housing 198. Central processor 264 also can be programmed to decentralize control the functions associated with DMD housing 132 and spotlight housing 198.

Figure 8:
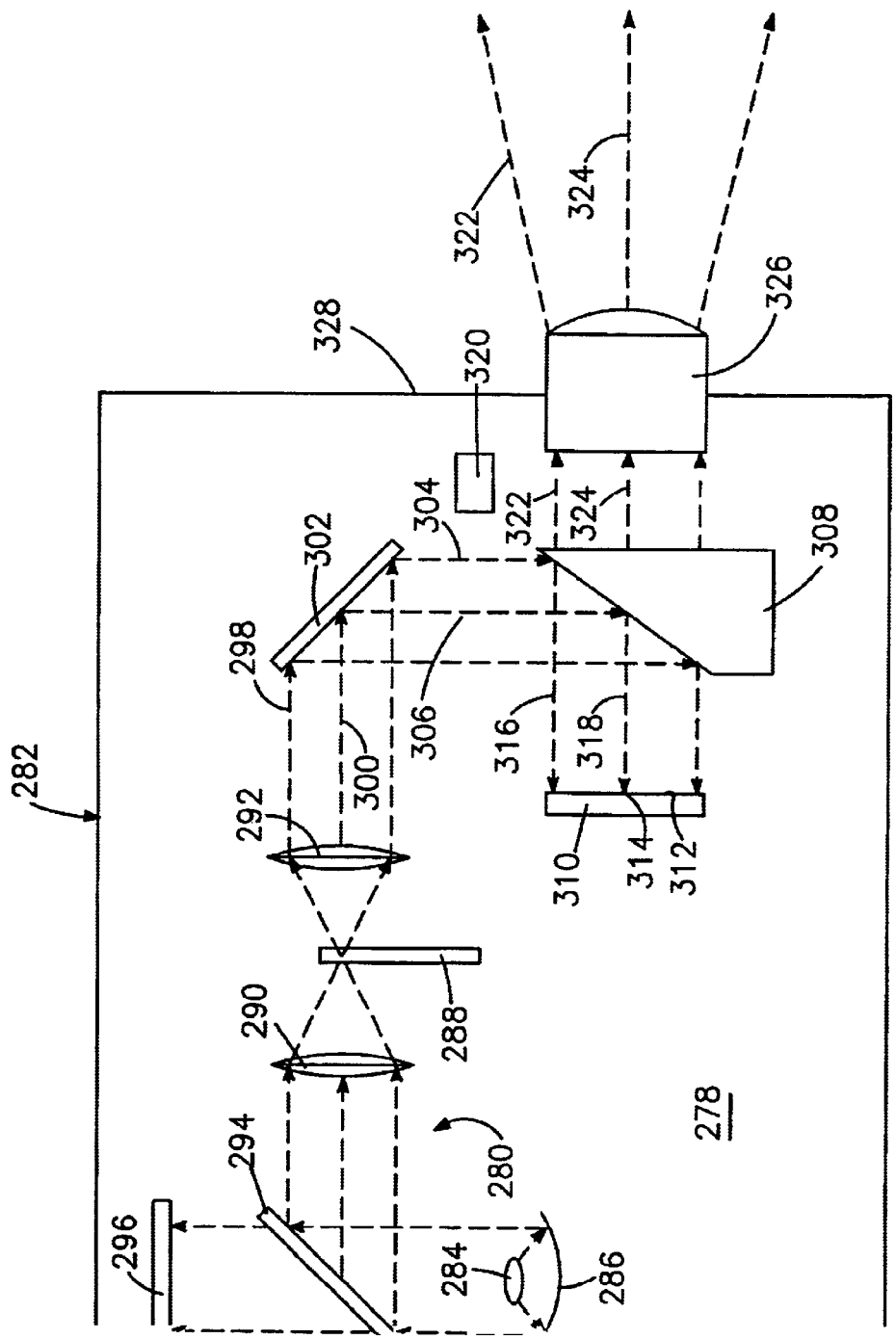
FIG. 8 is a schematic sectional side view of an embodiment of the present invention that includes a color wheel with a focusing lenses and a single Total Internal Reflection (TIR) prism and a single DMD chip with a fold mirror and a cold mirror with a heat sink mounted in a rotatable housing.

FIG. 8 illustrates a light display system 278 that shows a system architecture basically analogous to light display systems 10, 44, and 84 shown in FIGS. 1, 2, and 3. A luminaire 280 mounted in a rotatable housing 282 comprises a lamp 284 with a reflector 286, a color wheel 288 positioned between a pair of focus lenses 290 and 292, a cold mirror 294, and a heat sink 296.

An analog light beam 298 generated by lamp 284 containing a centrally located analog light ray 300 is directed at a fold mirror 302, which is a device that folds the light beam and so reduces the size of housing 282 as is known in the art. Fold mirror 302 reflects another analog light beam 304 containing an exemplary analog light ray 306 to a Total Internal Reflecting (TIR) prism 308 that is in close proximity to a DMD 310 that includes a surface array 312 of a plurality of pixel mirrors, or pixels, indicated as a single exemplary pixel mirror 314. The second analog light beam 316 with second analog light ray 318 that is directed at pixel mirrors 314 must be directed at 20 degrees to the normal of pixel mirrors 314. In addition, interference between second analog light beam 316 must not interfere with the resulting reflected digital light beam 322 including reflected digital light ray 324. One structure that avoids the problem of mechanical interference between the incident analog light beam 316 and the reflected digitized light beam 322 is the placement of TIR prism 308 between fold mirror 302 and DMD 310. Light from TIR prism 306 to pixels 314 is either 1) deflected from pixel mirrors 314 in one direction as a plurality of non-image forming light rays (not shown) to an opaque light stop 320 that is mounted within housing 282, or 2) is reflected from surface array 312 and pixels 314 as a reflected image-forming digitized light beam 322 at an angle that is directed in a manner known in the art including a plurality of exemplary light rays 324 through a projector lens 326 mounted in the front wall of housing 282 and continue on as widened digitized light beam 322 including exemplary digitized light ray 324 onto a stage display (not shown) such as stage display 36 shown in FIG. 1. Cold mirror 294 and heat sink 296 are optimal.

The architecture of light display system 278 is set forth in an article entitled "Display System Architectures for Digital Micromirror Device (DMD) Based Projectors", by James M. Florence and Lars A. Yoder, published July, 1996, Proc. SPIE, Vol. 2650, pp. 193–208. In particular, this particular architecture is described in a sub-heading entitled "1-DMD System Architecture" on pages 198–200. The advantage of the one-DMD architecture is described therein as being particularly efficient when the color wheel, such as color wheel 288 is shifted out of the optical path when a mono-coloring mode of operation can triple the light output. The 1-DMD system architecture in described on page 202 of the referenced article as being a low-cost/performance system. This article is incorporated by reference into the present application.

Figure 9:
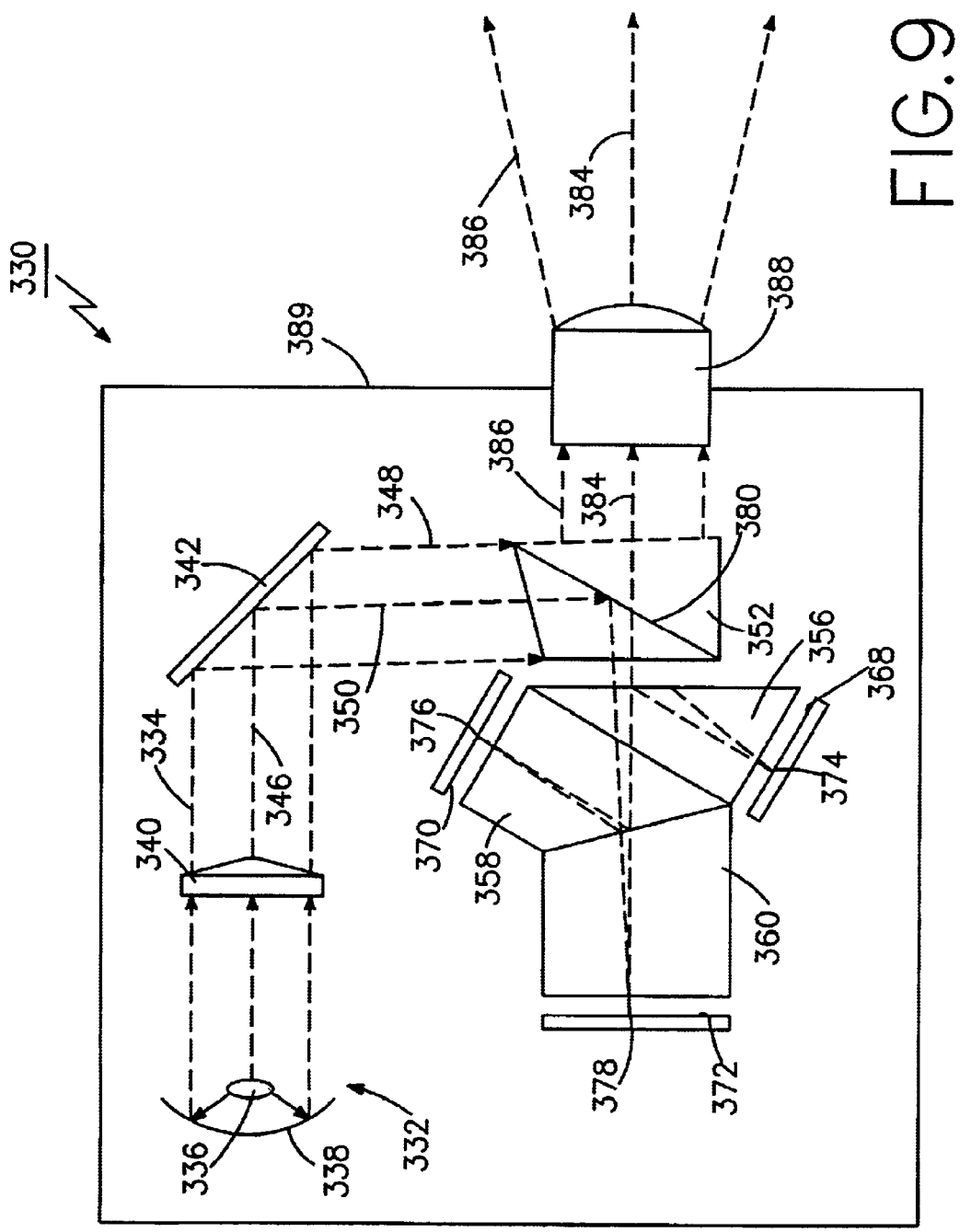
FIG. 9 is a schematic sectional side view of an embodiment side view of the present invention that includes a TIR prism engaged with a 3-color splitting prism assembly with three DMD chips and a DMD mounted in a rotatable housing.

FIG. 9 illustrates a light display system 330 that shows a system architecture basically analogous to light display systems 10, 44, 84, and 278 shown in FIGS. 1, 2, 3, and 8. A luminaire 332 is mounted in a housing 334 pannable and tiltable about an X-axis and a Y-axis as described in reference to DMD housing 132 in FIG. 4. Luminaire 332 comprises a lamp 336 with a reflector 338, a condenser lens 340 and a fold mirror 342.

An analog light beam 344 generated by lamp 336 containing a centrally located analog light ray 346 is directed at fold mirror 342 that is included as a device that shortens the length of light beams and so reduces the size of housing 334 as is known in the art. Fold mirror 342 reflects a second analog light beam 348 containing an exemplary second analog light ray 350 onto a Total Internal Reflecting (TIR) prism 352 that adjoins an optical architecture comprising a three-primary color prism assembly 354. Three color prism assembly 354 comprises three prism units 356, 358, and 360. Prism 356 adjoins TIR prism 352, prism 358 adjoins prism 356, and prism 360 adjoins prism 358. A first DMD 362 is mounted onto prism 358, a second DMD 364 is mounted onto prism 356, and a third DMD 366 is mounted onto prism 360. Three color prism assembly 354 in combination with DMDs 362, 364 and 366 combine to split the white light analog beam 348 into the red, green, and blue spectrums and in addition are structured to combine the three-spectrums into color combinations as directed by signals from a computer that are written to each Static Ram (SRAM) of each DMD 262, 364, and 366. The structure of prisms 356, 358, and 360 combined with DMDs 362, 364 and 366 are know in the art and are described in the article described earlier herein, namely, "Display System Architectures for Digital Micromirror Device (DMD) Based Projectors," which has been incorporated into the present application.

Each DMD 362, 364, and 366 includes a surface array 368, 370, and 372, respectively, that includes a plurality of pixel mirrors, or pixels, each successively indicated as a single exemplary pixel mirror 374, 376, and 378, respectively. After each color-splitting prism 356, 358, and 360 has split white light beam 348 into the three primary colors, each primary color is directed to the DMD assigned to that primary color where the primary color is digitized by pixels 374, 376, and 378. White light ray 346 strikes upon and is then reflected from surface 380 of TIR prism 352 into 3-color prism assembly 354 where split light rays 382 are generally indicated as illustrative of general splits of primary-color light rays to DMDs 362, 364, and 366 for digitization and emergence therefrom as colored digitized light rays. A colored digitized light ray 384 as representative of a final digitized colored light beam 386 is shown emerging from prism assembly 354 entering and being directed from projection lens 388 mounted in front wall 389 of housing 334 as part of an enlarged colored digitized light beam 386 being projected upon a stage display (not shown) such as stage display 36 as shown in FIG. 1.

The architecture of light display system 330 is set forth in the previously mentioned article entitled "Display System Architectures for Digital Micromirror Device (DMD) Based Projectors", by James M. Florence and Lars A. Yoder, published July, 1996, Proc. SPIE, Vol. 2650, pp. 193–208. The particular architecture of light display system 330 is described in a sub-heading entitled "3-DMD System Architecture" on pages 200–201. The 3-DMD architecture is also discussed in the article previously mentioned entitled "Digital Light Processing for High-Brightness, High Resolution Applications," previously mentioned and incorporated into the present application. The advantage of the 3-DMD architecture has several advantages for a large screen application including a bright projected image than other DMD architectural systems.

Figure 10:
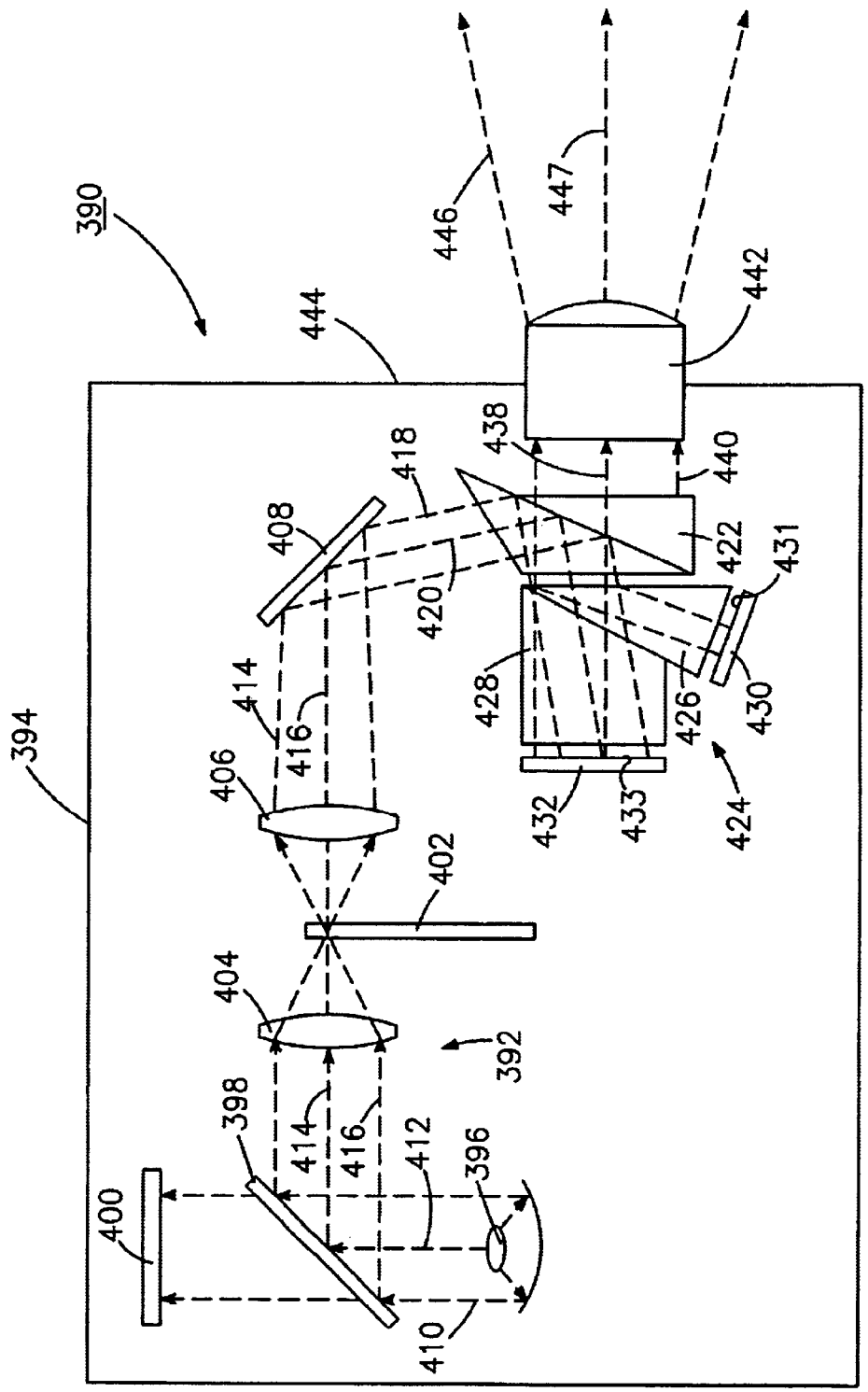
FIG. 10 is a schematic sectional side view of an embodiment of the present invention that produces a digitally generated three-color light beam that includes a color wheel and a TIR prism engaged with a 2-color splitting prism assembly two DMD chips mounted in a rotatable housing.

FIG. 10 illustrates a light display system 390 that shows a system architecture basically analogous to light display systems 10, 44, 84, 278 and 330 shown in FIGS. 1, 2, 3, 8, and 9. A luminaire 392 is mounted in a housing 394 pannable and tiltable about an X-axis and a Y-axis as described in reference to DMD housing 132 in FIG. 4. Luminaire 392 comprises a lamp 396 that is deficient in the red light, a cold mirror 398, a heat sink 400, a color wheel 402 having yellow and magenta filters, a pair of condenser lenses 404 and 406 placed on each side of color wheel 402, and a fold mirror 408. A first analog light beam 410 containing a first analog light ray 412 is directed at cold mirror 398, which passes certain non-visible wave lengths of the light spectrum (not indicated) to heat sink 400. Cold mirror 398 reflects a second analog light beam 414 including a second analog light ray 416 through a condenser lens 404 to color wheel 402 and from color wheel 402 to a condenser lens 406 to fold mirror 408 which reflects a third analog light beam 418 including a third analog light ray 420 to a TIR prism 422 which reflects third analog light beam 418 to a 2-color, or dichroic, prism assembly 424.

Dichroic prism assembly 424, which is shown in FIG. 10 schematically for purposes of illustration, includes a first prism 426 in proximity to TIR prism 422 that in turn adjoins a second prism 428 adjoining prism 426. A first DMD 430 having a plurality of pixel mirrors 431 is secured proximate to prism 428 and a second DMD 432 having a plurality of pixel mirrors 433 is secured proximate to prism 426. A blue and green light beam 434 is split off to first DMD 430 for image digitization and the red light beam 436 is split off to second DMD 432 that is reflected as a recombined digitized light beam 438 that contains a recombined digitized light ray 440 directed to a projector lens 442 mounted in front wall 444 from where an expanded digital light beam 446 including digital light ray 447 is directed to a stage display (not shown) that such as stage display 36 shown in FIG. 1. Digital control signals from a computer that are written to the addressing circuitry including the Static Ram (SRAM) of each DMD 426 and 428 are structured to combine the split color spectrums into color combinations in synchronization with the bistable rotations of each pixel mirror 431 of DMD 430 and of each pixel mirror 433 of DMD 432.

The particular architecture of light display system 390 is set forth in the previously mentioned article entitled "Display System Architectures for Digital Micromirror Device (DMD) Based Projectors", by James M. Florence and Lars A. Yoder, published July, 1996, Proc. SPIE, Vol. 2650, in a sub-heading entitled "2 DMD System Architecture" on pages 202–205. The advantage of the 3-DMD architecture has several advantages for a large screen application including a bright projected image than other DMD architectural systems. The advantage of the 2-DMD system is stated therein to be that the blue and green light output is increased over other light display systems and that the 2-DMD system is very optically efficient.

Figure 11:
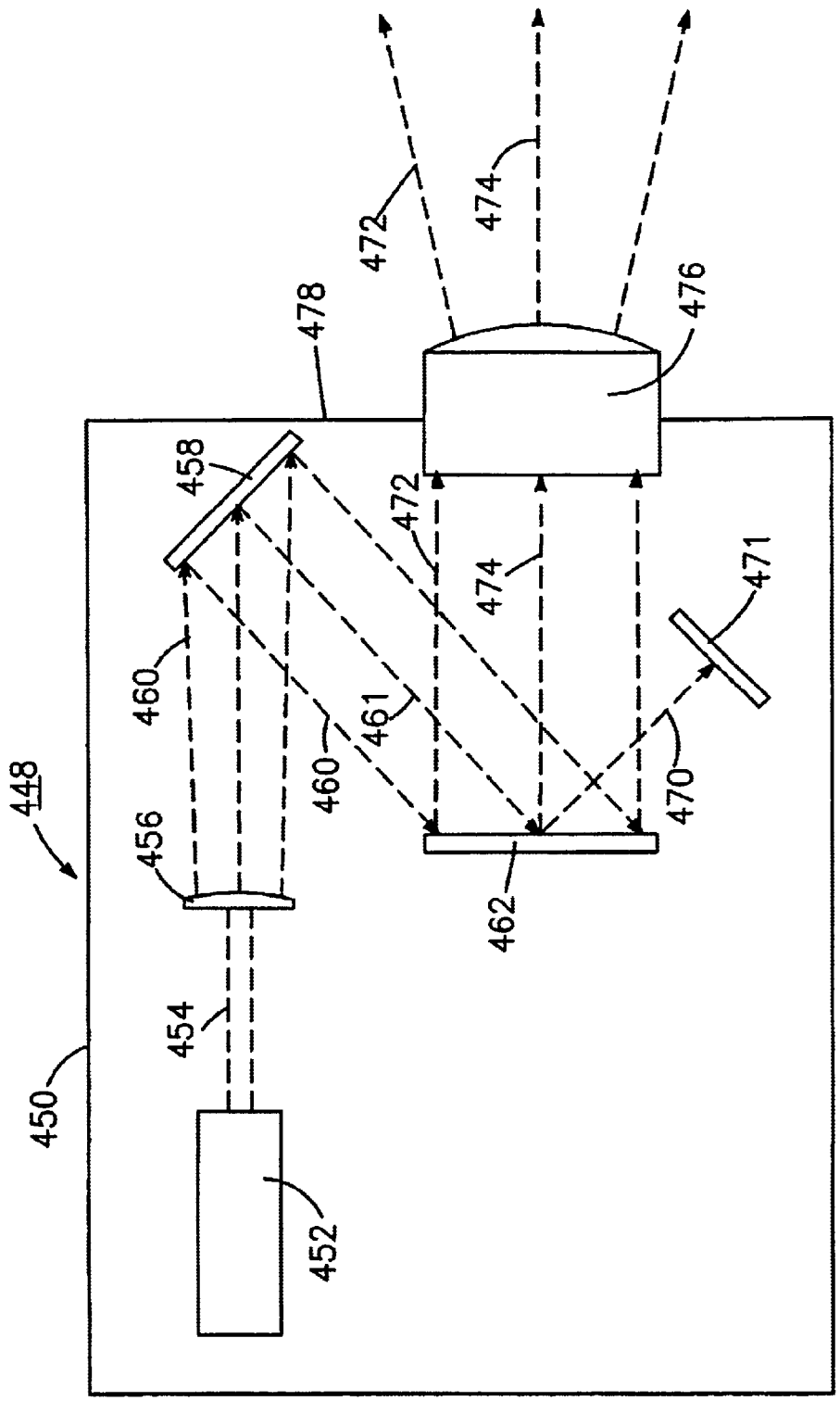
FIG. 11 is a schematic side view of an embodiment of the present invention that includes a laser generated light beam and a DMD mounted in a rotatable housing.

FIG. 11 illustrates a light display system 448 that shows a system architecture basically analogous to light display systems 10, 44, 84, 278, 330, and 390 shown in FIGS. 1, 2, 3, 8, 9, and 10. Light display system 448 is mounted in a housing 450 pannable and tiltable about an X-axis and a Y-axis as described in reference to DMD housing 132 in FIG. 4. Light display system 448 includes a single laser 452 that generates a white light beam 454 that is expanded at lens 456 and that is reflected at fold mirror 458 into a second white beam 460 that is directed to a DMD 462 that includes a surface array 464 comprising a plurality of pixel mirrors represented by a pixel 466. Light beam 460 includes a light ray 461 that represents for purposes of exposition a plurality of light rays of white light beam 460. Light beam 460 strikes surface array 464 with expository light ray 468 striking an expository pixel mirror 466. Pixel mirrors 466 are rotated into one of two directions in response to signals sent from a computer (not shown), one direction being such that digitized light represented by a deflected light ray 470 is directed to a light stop 471, and the other direction being such that a reflected digitized light beam 472 that contains a reflected digitized light ray 474 that has been both digitized and imaged by the rotational movements of the plurality of pixels 466 of DMD 462. Control signals sent to the addressing circuitry of DMD 462 causes pixels 466 to modulate white light beam 460 into digital light beam 472. Imaged digitized light beam 472 is directed to a projector lens 476 mounted in the front wall 478 of housing 450 from where digital light beam 472 is expanded and directed onto a stage display (not shown) analogous to stage display 36 shown in FIG. 1.

DMD 462 optionally performs a process of adding color by digitizing laser 452 at a lower frequency rate than the integration time for color of the human eye, which is to be distinguished from the CFF of the human eye. This coloring generation is discussed in U.S. Pat. Nos. 5,192,946 and 5,079, 544, referred to previously and incorporated herein especially on pages 12, 13, and 14 of the former mentioned patent.

Figure 12:
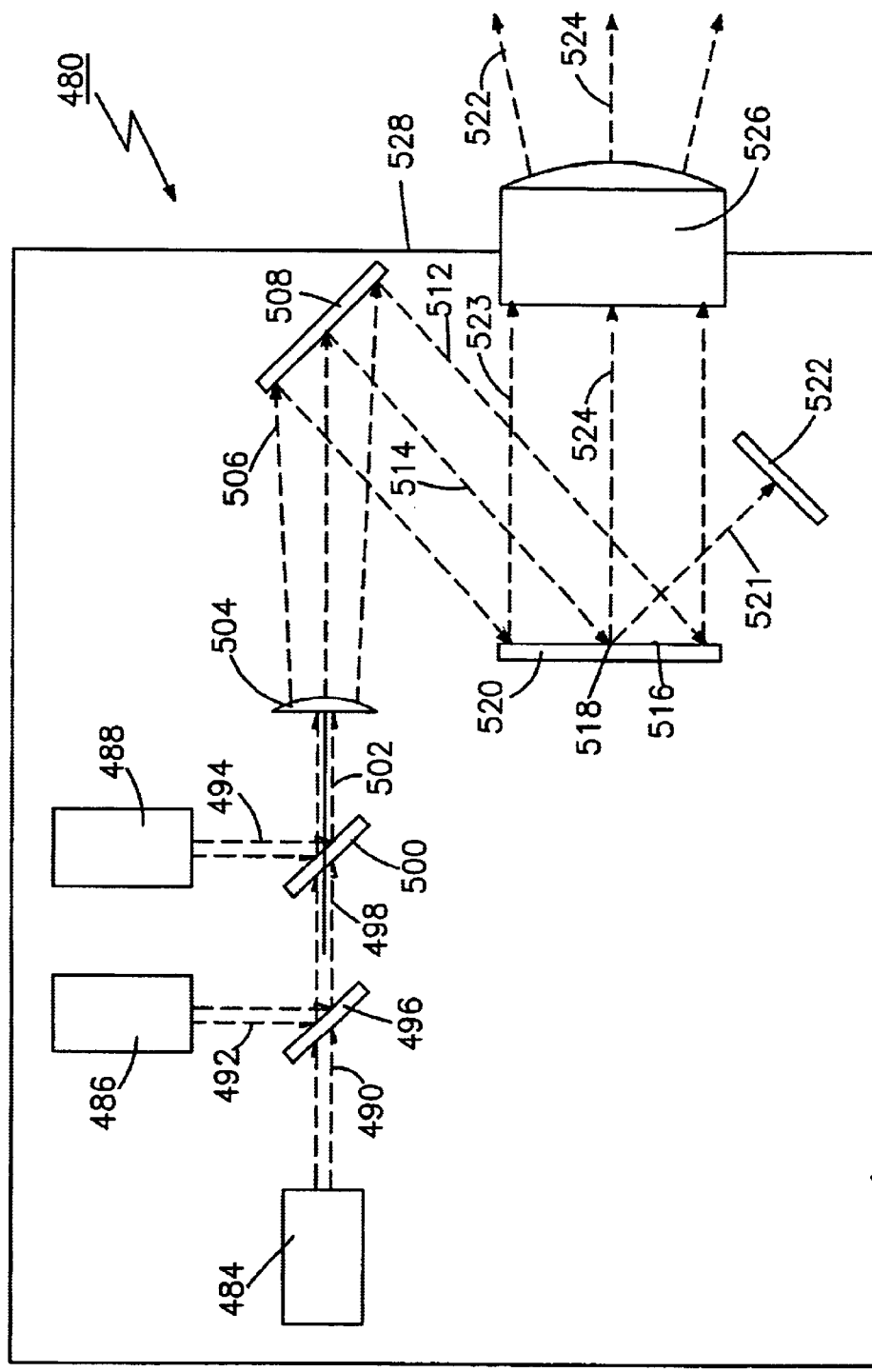
FIG. 12 is a schematic sectional side view of an embodiment of the present invention that includes three separate laser beam generators and further including a DMD mounted in a rotatable housing.

FIG. 12 illustrates a light display system 480 that shows a system architecture basically analogous to light display systems 10, 44, 84, 278, 330, 390 and 448 shown in FIGS. 1, 2, 3, 8, 9, 10 and 11. Light display system 480 is mounted in a housing 482 pannable and tiltable about an X-axis and a Y-axis as described in reference to DMD housing 132 in FIG. 4. Light display system 480 includes a green laser 484, a red laser 486, and a blue laser 488. Green laser 484 produces a beam of green light along an optical path 490, red laser 486 produces a beam of red light along an optical path 492, and blue laser 488 produces a beam of blue light along an optical path 494. A first combining mirror 496 passes the green light beam from optical path 490 through to an optical path 498 and also redirects the beam of red light from optical path 492 to the same optical path 498. A second recombining mirror 500 positioned in optical path 498 passes the green and red light from optical path 498 to an optical path 502 and also redirect the beam of blue light from optical path 494 to optical path 502. A lens. 504 expands the beam of light in optical path 502 to an enlarged combined light beam along an optical path 506 that is directed to a fold mirror 508. A beam of light is reflected from fold mirror 508 as a combined light beam 512 that includes an expository light ray 514 that strikes upon the surface array 516 of pixel mirrors, or pixels, represented by an expository pixel 518 of a DMD 520.

Pixel mirrors 518 are rotated into one of two directions in response to signals sent from a computer such as computer 42 shown in FIG. 4, one direction being such that digitized light represented by deflected light ray 521 is directed to a light stop 522, and the other direction being such that a reflected light ray 523 that is contained in a reflected digitized light beam 524 that has been both digitized and imaged by the bistable rotational movements of the plurality of pixels 518 of DMD 520. Combined color light beam 512 with expository light ray 514 are reflected by DMD 520 as digital imaged light beam 524 with reflected light ray 523 reflected from pixel 518. Digital light beam 524 with digital light ray 524 is directed to a projection lens 526 mounted in the front wall 528 of housing 482 that expands digited light beam 524 and directs digited light beam 524 with digited light ray 523 onto a stage display (not shown) analogous to stage display 36 shown in FIG. 1.

Figure 13:
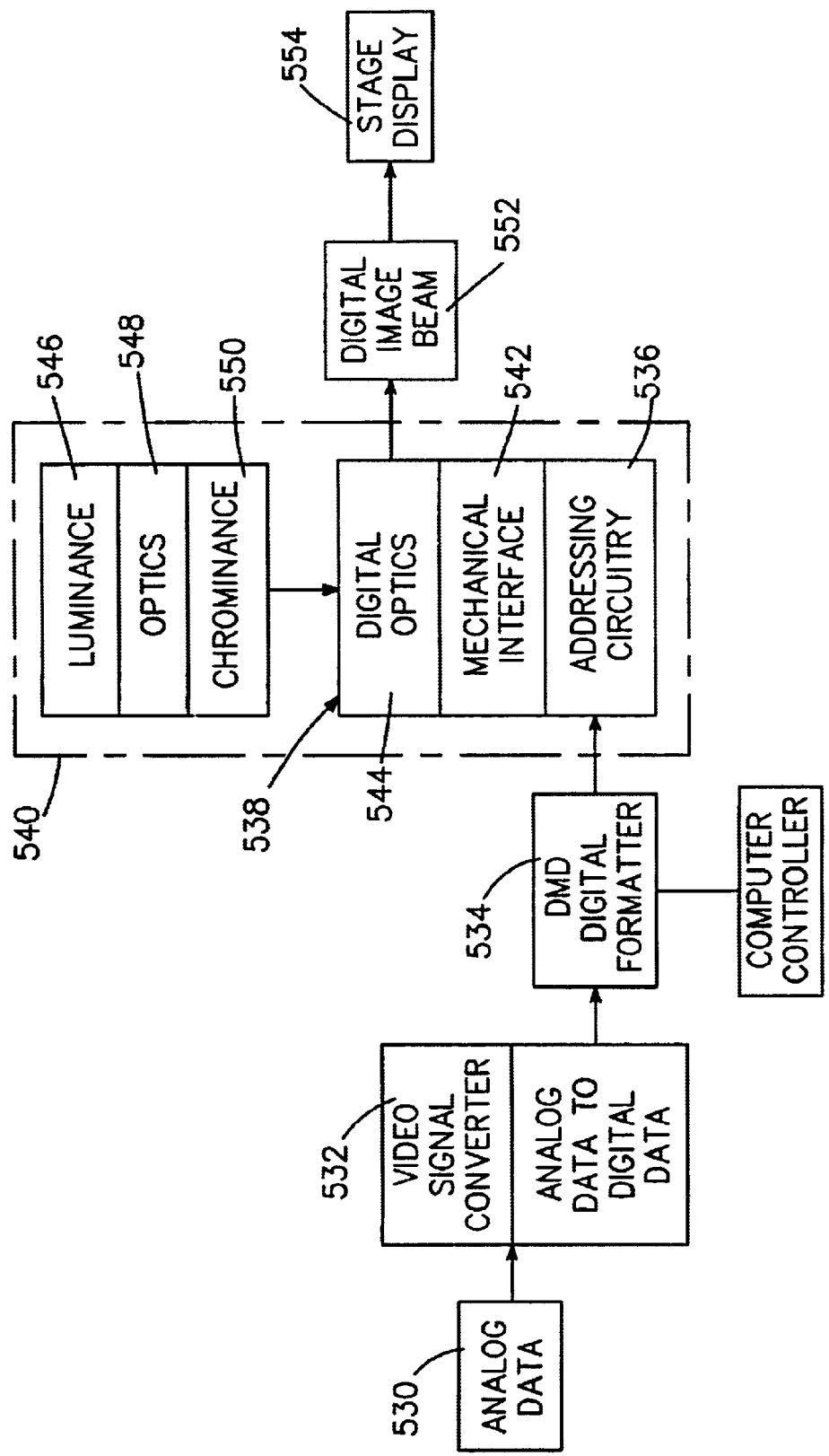
FIG. 13 is a basic block diagram of the creation of the digital light beam of each embodiment of the present invention.

FIG. 13 is a block diagram of the basic aspect of the embodiments of the lighting display systems disclosed herein. Analog data 530, when that is the basic available data, is converted to digital data at a video signal analog-to-digital image data converter 532. The digital image data is then prepared for application to a DMD at a DMD digital formatter 534. The prior mentioned systems, 530, 532, and 534, can be contained a single processor (not indicated). Once digital formatting is accomplished, control signals are directed to the addressing circuitry 536 that includes SRAM memory cells of a DMD 538, which is mounted in a DMD housing 540 (shown in phantom line) pannable and tiltable about an X-axis and a Y-axis. DMD housing 540 is analogous to any of the DMD housings of prior light display systems 10, 44, 84, 278, 330, 390, 448, and 480. DMD 538 includes a mechanical interface 542 and digital optics 544, which comprises a plurality of bistable pixels. Control signals sent to the addressing circuitry 536 directs the DMD mechanical interface 542 that controls the bistable rotations of the array of pixel mirrors that comprise the surface of DMD 538. Luminance 546, which can include a either a lamp or lasers, the system optics 548, and a system colorizer 550 such as color wheels 54, 94, 288, and 402, or digital color laser 454, or primary color lasers 484, 486, and 488 or color splitting prisms 356 and 358, or prisms 422, 426, and 428 are also mounted in rotatable housing 540. Digital optics 544 directs a digital image beam 552 to a stage display 554.

Figure 14:
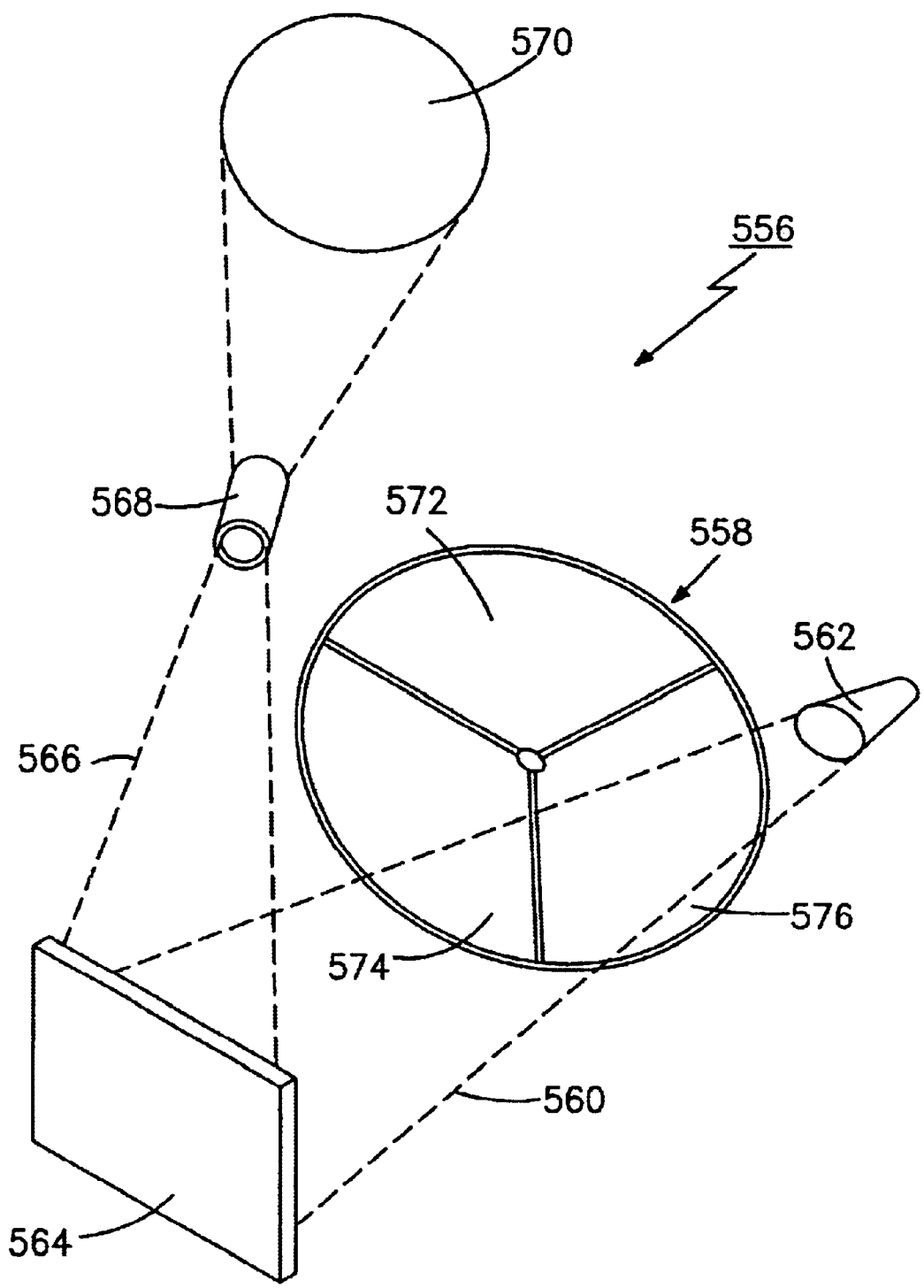
FIG. 14 is a perspective view of a single color wheel of the type with a plurality of colored filters at the perimeter.

FIG. 14 shows a simplified light display system 556 mounted in a rotatable housing (not shown) with a single color wheel 558 passing a light beam 560 from a light source 562 to a DMD 564 which in turn reflects a digital light beam 566 though a projection lens system 568 to form a digital moving image 570 upon a stage display. Single color wheel 558 is a standard color wheel that can be used for color wheel 54 shown in FIG. 2 or for color wheel 94 shown in FIG. 3. Color wheel 558 includes a triangle of the three primary color filters, a red filter 572, a green filter 574 and a blue filter 576. Color wheel 558 rotates continuously so that all three filters 568, 570 and 572 are interposed into the optic path of light beam 558. For example, if red is the desired color, red filter 572 would be in the off position and green filter 574 and blue filter 576 would be interposed into the optic path of light beam, thereby reducing the intensity or luminance of light beam 52 by two-thirds.

Figure 15:
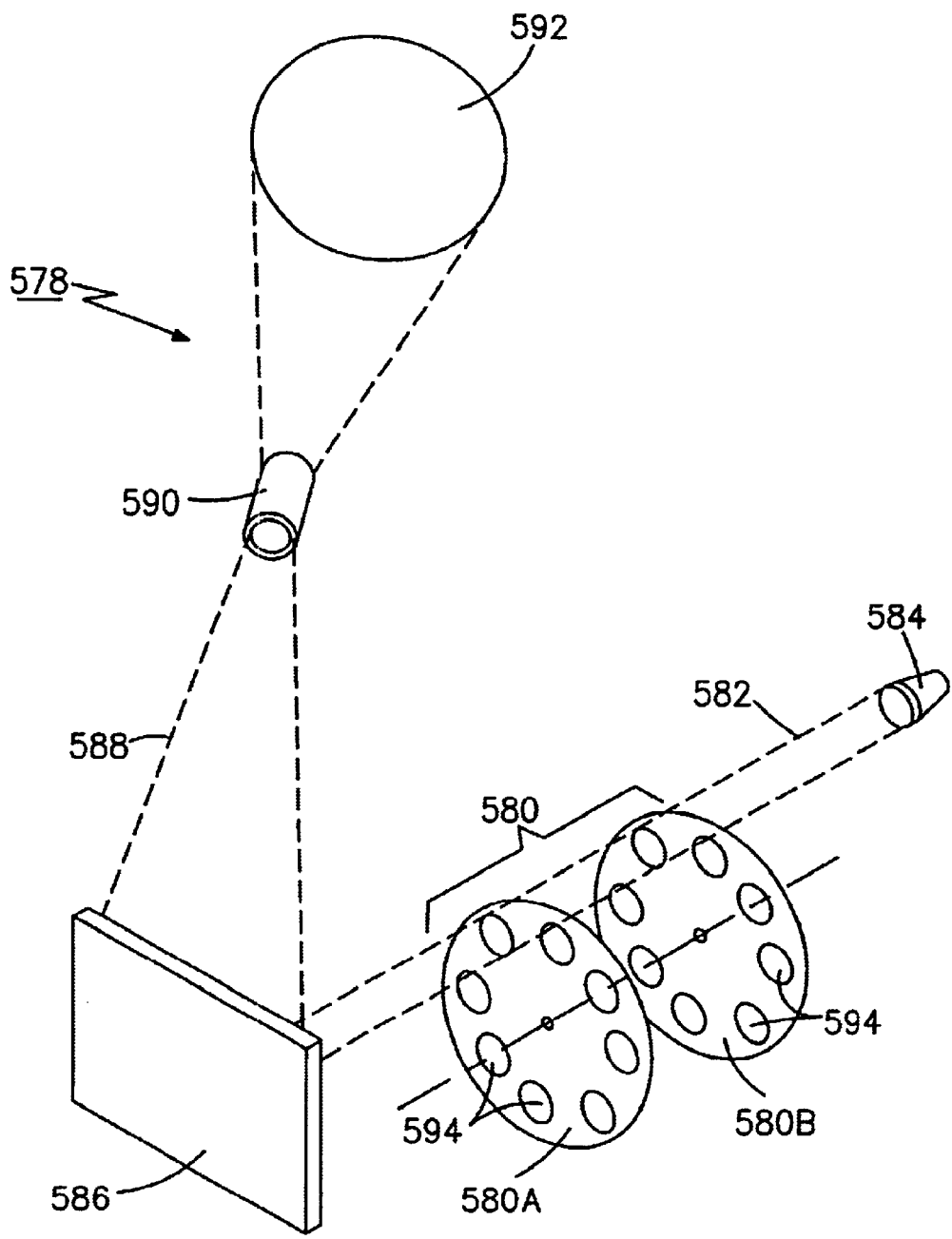
FIG. 15 is a perspective of a double color wheel of the type with a plurality of colored filters at the perimeters.

FIG. 15 shows a simplified light display system 578 mounted in a rotatable housing (not shown) with a double color wheel 580 comprising a color wheel 580A and a proximate color wheel 580B passing a light beam 582 from a light source 594 to a DMD 586 which in turn reflects a digital light beam 588 though a projection lens system 590 to form a digital image 592 upon a stage display. Each color wheel 580A and 580B includes a plurality of circular color filters, shown as eight color filters 594 for each color wheel 580A and color wheel 580B for purposes of exposition only. Each color filter 594 is used to generate a gobo generated image, that is, DMD 586 is used as a gobo generating imager and such a configuration does not allow for the projection of a full color motion image. Double color wheel 580 provides more vivid colors and greater light output that each color wheel 580A or 589B being used alone.

Figure 16:
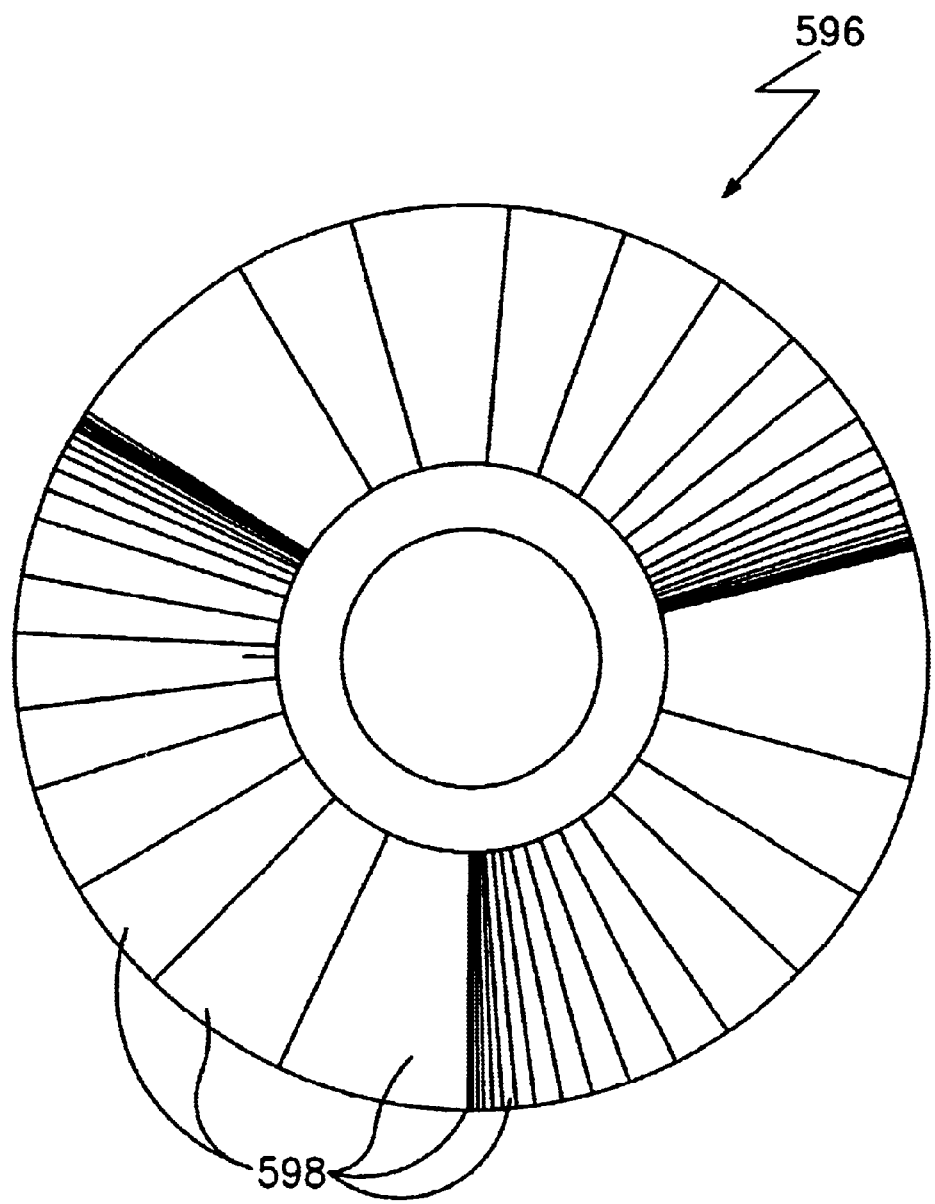
FIG. 16 is a front view of a spinnable color wheel having a plurality of color filters.

FIG. 16 shows a color wheel 596 having a plurality of varying color filter wedge sections 598 that can be used for color wheel 54 shown in FIG. 2 or for color wheel 94 shown in FIG. 3. Each color wheel section 598 filters all the colors except the color filter positioned in the optic path of the light beam from the light source that is eventually directed to a DMD. Single color wheel 16 can be used for control both luminance and coloring.

Luminance and coloring of the DMD light display systems can be controlled by the modulation rate of the mirror pixels of the DMD which can be switched between reflected and deflected modes at a time period of 20 microseconds, which is a rate 833 times than the CFF of the human eye. As the switching rate, or modulation rate, of the mirror pixels of the DMD decreases from the 20 microseconds, less light is directed to the stage display. Discussion of luminance and coloring is discussed on page 13, lines 1–68 in U.S. Pat. No. 5,192,946, which has been previously incorporated into the present application.

The embodiments of the invention particularly disclosed and described hereinabove are presented merely as examples of the invention. Other embodiments, forms, and modifications of the invention coming within the proper scope and spirit of the appended claims will, of course, readily suggest themselves to those skilled in the art. Other embodiments or modifications are intended to be reserved especially as they fall within the scope and spirit a of the subjoined claims.

What is claimed is:

1. A light display system for projecting digitally generated light is onto a stage display, comprising:

a housing rotatable about at least a first axis and a second axis;

said second axis transverse to said at least first axis;

said first and said second axes are respectively a horizontal axis and a vertical axis;

a deformable micromirror device having a surface comprising an array of deformable mirror cells, said deformable mirror device being mounted in said housing;

a light source means mounted in said housing for directing a light beam in an optical path that impinges upon said surface of said deformable mirror device;

digital signal means for providing digital control signals to said deformable micromirror device for activating selected deformable mirror cells of said deformable micromirror device to reflect image-forming digitized light beams onto the stage display;

said housing including first means for rotating said housing about said vertical axis and a second means for rotating said housing about said horizontal axis;

said first means for rotating said housing about said vertical axis a first driver securable to a fixed structure and operatively connected to said housing and said second means for rotating said housing about said horizontal axis is a second driver operatively supportable by said fixed structure and operatively connected to said housing;

a housing movement computer means connected to said first and second drivers for rotating said housing in a predetermined sequence of combined horizontal and vertical movements; and said predetermined sequence of combined horizontal and vertical movements are synchronized in predetermined timed and spatial sequences with said digitally generated light beams being reflected from said deformable mirror device and directed onto the stage display.

2. The light display system according to claim 1, wherein said light source means includes a lamp and a beam columnator lens.

3. The light display system according to claim 2, further including a projector lens mounted in said housing directing said digitized light means from said deformable mirror cells onto the stage display.

4. The light display system according to claim 3, wherein each said deformable mirror cell is rotatable between a first position and a second position, the first position being when a reflected light ray from said light beam on said optical path is directed onto the stage display as said digitally generated light beam and a second position wherein a deflected light ray from said light beam on said optical path is directed away from the stage display, and further including an opaque light stop mounted in said housing, said deflected light ray being directed onto said opaque stop.

5. The light display system according to claim 1, further including a cold mirror and a heat sink mounted in said housing proximate to said light source means.

6. The light display system, according to claim 1, further including optical means for adding coloring and luminance to said digitally selected light beams.

7. The light display system according to claim 6, wherein said optical means includes a first focus lens system positioned proximate to said light source means and a second focus lens system spaced from said first focus lens system and further includes a rotatable color wheel positioned between said first and second focus lens system, said second focus lens system projecting said light beam on said optical path to said surface of said deformable mirror device.

8. The light display system according to claim 7, wherein said light source means generates a white light and said rotatable color wheel includes a plurality of color filters wherein said white light is filtered into said color wheel during rotation of said color wheel so as to produce a plurality of colors of the visible spectrum.

9. The light display system according to claim 8, wherein said digital signal means includes digital data relating to color and luminance activating said color wheel in synchronicity with said digital control signals to said deformable micromirror device.

10. The light display system according to claim 7, wherein said color wheel includes a plurality of individual color filters wherein said white light is directed into selected individual filters positioned to intercept said white light.

11. The light display system according to claim 6, wherein said light source means and said optical means for adding color and luminance includes a color system comprising three lasers producing each of the primary colors, red, green, and blue that combine into said light beam in said optical path that impinges upon said surface of said deformable mirror device.

12. The light display system according to claim 11, wherein said digital signal means includes digital data relating to color and luminance activating said three lasers in synchronicity with said digital control signals to said deformable micromirror device.

13. The light display system according to claim 6, wherein said light source means is a signal multimode laser.

14. The light display system according to claim 13, wherein said digital signal means includes digital data relating to color and luminance activating said mutimode laser to tune said multimode laser to different frequencies and intensities in synchronicity with said digital control signals to said deformable mirror device.

15. The light display system according to claim 6, further including prism means for directing said reflected digitized light beam said light beam void of mechanical interference, said prism means being a Total Internal Reflective (TIR) prism positioned in said housing between said deformable mirror device and said projection lens mounted.

16. The light display system according to claim 15, further including optical means for adding color and luminance to said digitally selected light beams.

17. The light display system according to claim 16, wherein said optical means includes a first focus lens system positioned proximate to said light source means and a second focus lens system spaced from said first focus lens system and further includes a rotatable color wheel positioned between said first and second focus lens system, said second focus lens system projecting said light beam on said optical path to said surface of said deformable mirror device.

18. The light display system according to claim 17, wherein said color wheel includes a plurality of color filters wherein a white light from said light source means is filtered into said color wheel during rotation of said color wheel so as to produce a plurality of colors.

19. The light display system according to claim 18, wherein said digital signal means includes digital data relating to color and luminance activating said color wheel to different frequencies and intensities in synchronicity with said digital control signals to said deformable mirror device.

20. The light display system according to claim 17, further including a dichroic prism assembly positioned between said TIR and said deformable minor device.

21. The light display system according to claim 17, wherein said color wheel has at least yellow and magenta filters.

22. The light display system according to claim 20, wherein said dichroic prism assembly includes at least a first prism and a second prism and further including a first DMD secured proximate to said first prism and a second DMD secured prior to said second prism, wherein said first prism splits off a blue and green light spectrum beams to said first DMD for image digitization and the red light beam is split off to said second DMD for image digitization and a recombined digitized light beam directed to said projection lens and to the stage display.

23. The light display system according to claim 22, wherein said digital signal means includes digital data relating to color and luminance synchronicity with said digital control signals activating said color wheel to different frequencies and intensities in synchronicity with said digital control signals to said deformable mirror device and further includes digital data relating to said digital control signals to combine said green and red light spectrum beams in combination with said spectrum beams from said color wheel into selected color combinations in synchronicity with said digitally selected light beams.

24. The light display system according to claim 16, wherein said optical means for adding color and luminance to said digitally selected light beans includes a three-primary color prism assembly adjoining said TIR, said three-primary color prism comprising a first prism, a second prism, and a third prism and further including a first DMD mounted onto said first prism, a second DMD mounted onto said second prism, and a third DMD mounted onto said third prism, said three-color prism assembly combined with said first, second, and third DMD's combined to split said light beam from said light source means into the red, green, and blue spectrums.

25. The light display system according to claim 24, wherein said digital signal means includes digital data relating to said digital control signals to said first, second, and third DMD's that direct said red, green and blue light spectrums into color combinations in synchronicity with said digitally selected light beams.

26. The light display system according to claim 1, wherein said first means for rotating said housing about said horizontal axis and said second means for rotating said housing about said vertical axis is at least one hand grip connected to said housing.

27. The light display system according to claim 1, wherein said first means for rotating said housing about said vertical axis is at least one hand grip operatively secured to a fixed structure and operatively connected to said housing and said means for rotating said housing about said horizontal axis is at least one hand grip operatively connected to said fixed structure and operatively connected to said housing.

* * * * *